(12) United States Patent
Decker et al.

(10) Patent No.: US 11,072,559 B2
(45) Date of Patent: Jul. 27, 2021

(54) COATINGS HAVING CONTROLLED ROUGHNESS AND MICROSTRUCTURE

(71) Applicant: Corning Incorporated, Corning, NY (US)

(72) Inventors: Heather Bossard Decker, Arkport, NY (US); Shandon Dee Hart, Elmira, NY (US); Karl William Koch, III, Elmira, NY (US); Charles Andrew Paulson, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 21 days.

(21) Appl. No.: 16/635,645

(22) PCT Filed: Jul. 30, 2018

(86) PCT No.: PCT/US2018/044394
§ 371 (c)(1),
(2) Date: Jan. 31, 2020

(87) PCT Pub. No.: WO2019/027909
PCT Pub. Date: Feb. 7, 2019

(65) Prior Publication Data
US 2021/0130230 A1 May 6, 2021

Related U.S. Application Data

(60) Provisional application No. 62/539,112, filed on Jul. 31, 2017.

(51) Int. Cl.
*B32B 17/06* (2006.01)
*C03C 17/42* (2006.01)
(Continued)

(52) U.S. Cl.
CPC .......... *C03C 17/42* (2013.01); *C03C 17/3435* (2013.01); *G02B 1/118* (2013.01); *G02B 1/14* (2015.01); *C03C 2217/734* (2013.01)

(58) Field of Classification Search
CPC ................ C03C 17/42; C03C 17/3435; C03C 2217/734; G02B 1/14; G02B 1/118;
(Continued)

(56) References Cited

U.S. PATENT DOCUMENTS 7,018,727 B2 * 3/2006 Dzick ................. C03C 17/3417
428/699
7,381,469 B2 6/2008 Moelle et al.
(Continued)

FOREIGN PATENT DOCUMENTS

WO 2015076914 A1 5/2015

OTHER PUBLICATIONS

Fisher-Cripps; "A Critical Review of Analysis and Interpretation of Nanoindentation Test Data"; Surface & Coatings Technology; 200; pp. 4153-4165 (2006.
(Continued)

*Primary Examiner* — Lauren R Colgan

(57) ABSTRACT

An article includes a glass, glass-ceramic or ceramic substrate including a primary surface. A functional coating is disposed over the primary surface of the substrate. The coating includes a first portion disposed over the primary surface. One or more interrupting layers are disposed over the first portion. A second portion is disposed over the one or more interrupting layers. The one or more interrupting layers includes a microstructure different than one of the first and second portions and the coating has an average optical transmittance greater than about 10% over the visible wavelength range from about 450 nm to about 650 nm.

19 Claims, 13 Drawing Sheets

(51) Int. Cl.
*C03C 17/34* (2006.01)
*G02B 1/14* (2015.01)
*G02B 1/118* (2015.01)

(58) Field of Classification Search
CPC ............ B32B 2250/03; B32B 2250/05; B32B 2250/42; B32B 255/28; B32B 2307/40; B32B 17/06
USPC ................ 428/426, 428, 432, 434, 701, 702
See application file for complete search history.

(56) References Cited

U.S. PATENT DOCUMENTS

| | | | |
|---|---|---|---|
| 9,079,802 | B2 | 7/2015 | Bellman et al. |
| 9,335,444 | B2* | 5/2016 | Hart .......................... G02B 1/11 |
| 9,359,261 | B2 | 6/2016 | Bellman et al. |
| 9,366,784 | B2 | 6/2016 | Bellman et al. |
| 9,586,858 | B2 | 3/2017 | Bellman et al. |
| 10,416,352 | B2* | 9/2019 | Hart .......................... C03C 17/42 |
| 10,487,009 | B2 | 11/2019 | Decker et al. |
| 10,730,790 | B2* | 8/2020 | Paulson ............... H05K 5/0017 |
| 10,914,867 | B2* | 2/2021 | Amin ....................... G02B 1/14 |
| 2004/0258947 | A1* | 12/2004 | Moelle ..................... G02B 1/14 428/627 |
| 2009/0104462 | A1 | 4/2009 | Windt |
| 2014/0106150 | A1* | 4/2014 | Decker ............... C03C 17/3435 428/216 |
| 2014/0220327 | A1* | 8/2014 | Adib ....................... C03C 17/22 428/217 |
| 2014/0335330 | A1* | 11/2014 | Bellman ............... C04B 35/597 428/212 |
| 2014/0335335 | A1* | 11/2014 | Koch, III ................ G02B 1/10 428/213 |
| 2014/0376094 | A1* | 12/2014 | Bellman ................ G02B 1/113 359/580 |
| 2014/0377522 | A1* | 12/2014 | Koch, III ............ C23C 14/0676 428/213 |
| 2015/0322270 | A1* | 11/2015 | Amin .................. C03C 17/3435 428/141 |

OTHER PUBLICATIONS

Hay et al; "Continuous Stiffness Measurement During Instrumented Indentation Testing" ; Experimental Techniques; 34 (3) pp. 86-94 (2010.

International Search Report and Written Opinion of the International Searching Authority; PCT/US2018/044394; dated Sep. 28, 2018; 15 Pages; European Patent Office.

Kittel; "Introduction of Solid State Physics" ; Seventh Edition, John Wiley & Sons Inc, NY (1996) pp. 611-627.

Shackelford; "Materials Science for Engineers" ; Sixth Edition, Pearson Prentice Hall, New Jersey; pp. 404-418 (2005.

Smart and Moore, :Solid State Chemistry, and Instroduction; Chapman & Hall University and Professional Division, London, 1992 pp. 136-151.

Southwell, "Coating design using very thin high-and low-index layers," Applied Optics, vol. 24, Issue 4, pp. 457, (1985).

* cited by examiner

COATINGS HAVING CONTROLLED ROUGHNESS AND MICROSTRUCTURE

CROSS-REFERENCE TO RELATED APPLICATION

This application claims the benefit of priority under 35 U.S.C. § 371 of International Application Serial No. PCT/US2018/044394, filed Jul. 30, 2018, which claims the benefit of priority under 35 U.S.C. § 119 of U.S. Provisional Application Ser. No. 62/539,112, filed on Jul. 31, 2017, the contents of both of which are relied upon and incorporated herein by reference in their entirety.

FIELD OF THE DISCLOSURE

The disclosure relates to articles with functional coatings, and more particularly to articles having hard functional coatings having a controlled roughness and microstructure, and particular optical properties.

BACKGROUND

Transparent hardcoatings, for example $AlN_x$, $AlO_xN_y$, $Al_2O_3$, $ZrO_2$—$Al_2O_3$, $SiN_x$, $SiO_xN_y$, diamond or diamond-like coatings, and/or $ZrO_2$ may have an amorphous, polycrystalline or semi-crystalline microstructure, which depends on the conditions of their fabrication. These coatings may be valuable for a variety of applications. For example, such coatings may be useful as hard, scratch, or wear-resistant coatings over substrates with high optical transparency. These materials can have a natural tendency to form a polycrystalline or semi-crystalline microstructure. This polycrystalline microstructure may impart certain benefits such as mechanical toughness or piezoelectric properties. In order to maximize the benefit of these properties, it may be advantageous to engineer the crystallite size (e.g., to reduce the crystallite size in order to control the coating surface roughness). Surface roughness of hardcoatings is believed to play an important role in certain mechanical wear performance tests, fictive contact events, and the durability of thin organic low-friction layers (e.g., easy to clean coatings such as 1-10 nanometere (nm) thick fluorosilane coatings) that are deposited on top of the hardcoating.

Thus, there is a need for methods to control polycrystalline or semi-crystalline hardcoating microstructure, crystallite size, and surface roughness, while maintaining optical transparency of underlying substrates for use in displays, touch screens, eyeglasses, windows, and similar applications. Accordingly, there is also a need for articles having hard functional coatings with a controlled roughness and microstructure, and particular optical properties.

SUMMARY OF THE DISCLOSURE

According to some aspects of the present disclosure, an article includes a glass, glass-ceramic or ceramic substrate including a primary surface. A functional coating is disposed over the primary surface of the substrate. The coating includes a first portion disposed over the primary surface. One or more interrupting layers are disposed over the first portion. A second portion is disposed over the one or more interrupting layers. The one or more interrupting layers includes a microstructure different than one of the first and second portions and the coating has an average optical transmittance greater than about 10% over the visible wavelength range from about 450 nm to about 650 nm.

According to some aspects of the present disclosure, an article includes a substrate which includes a primary surface and a glass, glass-ceramic or ceramic composition. A functional coating is disposed over the primary surface of the substrate to form a coated surface. The coating including a first portion is disposed over the primary surface. A plurality of interrupting layers is disposed over the first portion and includes a different microstructure than the first portion. A second portion is disposed over the plurality of interrupting layers. The interrupting layers include an optical transmittance of greater than about 85% over the visible wavelength range from about 450 nm to about 650 nm and each of the interrupting layers has a thickness of 100 nm or less.

According to yet other aspects of the present disclosure, a consumer electronic product includes a housing having a front surface, a back surface and side surfaces. Electrical components are at least partially within the housing, the electrical components include at least a controller, a memory, and a display, the display at or adjacent the front surface of the housing. A cover glass is disposed over the display. At least one of a portion of the housing or the cover glass comprises the article as described above.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

According to a first aspect, an article is provided that includes a glass, glass-ceramic or ceramic substrate comprising a primary surface, and a functional coating disposed over the primary surface of the substrate. The coating includes a first portion disposed over the primary surface, one or more interrupting layers disposed over the first portion, and a second portion disposed over the one or more interrupting layers. The one or more interrupting layers include a microstructure different than one of the first and second portions and the coating has an average optical transmittance greater than about 10% over the visible wavelength range from about 450 nm to about 650 nm.

According to a second aspect, the article of aspect 1 is provided, wherein the one or more interrupting layers comprise a microstructure which is different than both the first and second portions.

According to a third aspect, the article of either of aspects 1 and 2 is provided, wherein the one or more interrupting layers has an amorphous microstructure.

According to a fourth aspect, the article of any of aspects 1-3 is provided, wherein the first and second portions of the coating each comprise a plurality of layers and the coating has an average optical transmittance greater than about 50%.

According to a fifth aspect, the article of any of aspects 1-4 is provided, wherein the second portion of the coating within about 100 nm from the interrupting layers comprises an average microstructural crystal size that is smaller than an average micro structural crystal size of the first portion within about 100 nm from the interrupting layers.

According to a sixth aspect, the article of any of aspects 1-5 is provided, wherein each of the one or more interrupting layers comprises a thickness of about 50 nm or less.

According to a seventh aspect, the article of aspect 6 is provided, wherein the one or more interrupting layers comprise a thickness of about 10 nm or less.

According to an eighth aspect, the article of any of aspects 1-7 is provided, wherein the one or more interrupting layers is porous.

According to a ninth aspect, the article of any of aspects 1-8 is provided, wherein at least one of the first and second portions comprises a thickness from about 0.1 µm to about 2 µm.

According to a tenth aspect, the article of any of aspects 1-8 is provided, wherein the one or more interrupting layers comprise three layers, and the article further comprises a plurality of spacing layers positioned between the one or more interrupting layers.

According to an eleventh aspect, the article of any of aspects 1-10 is provided and further comprises an easy-to-clean (ETC) coating disposed over the second portion of the functional coating.

According to a twelfth aspect, the article of any of aspects 1-11 is provided, wherein the coating comprises a surface roughness of about 5 nm Rq or less.

According to a thirteenth aspect, an article is provided which includes a substrate including a primary surface and comprising a glass, glass-ceramic or ceramic composition and a functional coating disposed over the primary surface of the substrate to form a coated surface. The coating includes a first portion disposed over the primary surface, a plurality of interrupting layers disposed over the first portion and comprising a different microstructure than the first portion, and a second portion disposed over the plurality of interrupting layers. The interrupting layers include an optical transmittance of greater than about 85% over the visible wavelength range from about 450 nm to about 650 nm and each of the interrupting layers has a thickness of 100 nm or less.

According to a fourteenth aspect, the article of aspect 13 is provided, wherein the plurality of interrupting layers comprises a refractive index difference of about 0.1 or greater from any of the first and second portions, and wherein each of the interrupting layers has a thickness of about 5 nm or greater.

According to a fifteenth aspect, the article of either of aspects 13 and 14 is provided, wherein the coating comprises a surface roughness of about 5 nm Rq or less.

According to a sixteenth aspect, the article of any of aspects 13-15 is provided, wherein the first and second portions comprise respective first and second bulk layers, the first and second bulk layers each comprising a thickness of about 200 nm or greater.

According to a seventeenth aspect, the article of aspect 16 is provided, wherein the first and second bulk layers are each in contact with at least one of the plurality of interrupting layers.

According to an eighteenth aspect, the article of article of any of aspects 13-17 is provided, wherein the plurality of interrupting layers comprises $Al_2O_3$.

According to a nineteenth aspect, the article of any of aspects 13-18 is provided, wherein the substrate comprises a compressive stress region, the compressive stress region extending from the primary surface to a first selected depth in the substrate.

According to a twentieth aspect, the article of any of aspects 13-19 is provided, wherein the plurality of interrupting layers comprises a thickness that is about 10% or less of a total thickness of the functional coating.

According to a twenty-first aspect, a consumer electronic product is provided including a housing having a front surface, a back surface and side surfaces, electrical components at least partially within the housing, the electrical components comprising at least a controller, a memory, and a display, the display at or adjacent the front surface of the housing, and a cover glass disposed over the display. At least one of a portion of the housing or the cover glass comprises the article of any one of aspects 1-20.

According to a twenty-second aspect, the article of any of aspects 13-19 is provided, wherein the coated surface has a hardness of about 12 or greater as measured by Berkovich nanoindentation at indention depths of about 100 nm or greater.

According to a twenty-third aspect, the article of any of aspects 13-19 is provided, wherein the first portion and/or the second portion of the functional coating comprises polycrystalline or semi-crystalline material.

According to a twenty-fourth aspect, the article of any of aspects 13-19 is provided, wherein the first portion and/or the second portion of the functional coating comprises polycrystalline or semi-crystalline material comprising $AlO_xN_y$, where x (representing the molar fraction of oxygen relative to aluminum) is from about 0.02 to about 0.25; and where y (representing the molar fraction of nitrogen relative to aluminum) is from about 0.75 to about 0.98.

According to a twenty-fifth aspect, a method of forming a functional coating on a substrate is provided which includes the steps: depositing a first portion on a primary surface of the substrate; depositing one or more interrupting layers comprising a different microstructure than the first portion over the first portion and an optical transmittance of greater than about 85% over the visible wavelength range from about 450 nm to about 650 nm; and depositing a second portion over the one or more interrupting layers.

According to a twenty-sixth aspect, the method of aspect 25 is provided, wherein the step of depositing one or more interrupting layers further comprises the step of depositing the one or more interrupting layers to comprise a thickness of about 100 nm or less.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1A:
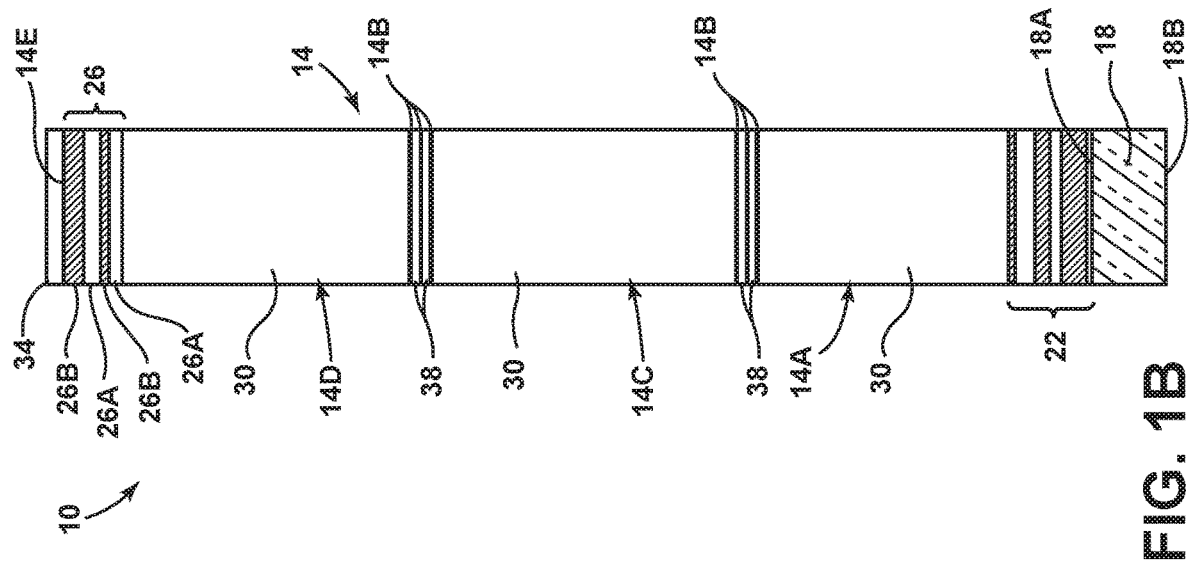
FIG. 1A is a cross-sectional view of an article including a film, according to at least one example.

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1B:
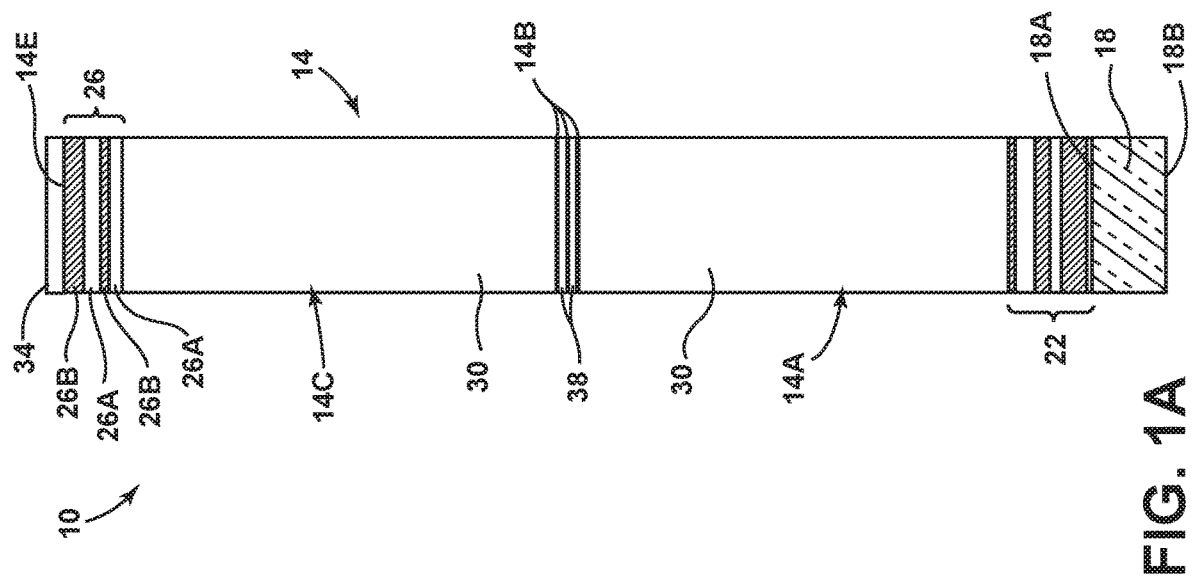
FIG. 1B is a cross-sectional view of an article including a film, according to at least one example.

Referring now to FIGS. 1A and 1B, a laminate article 10 includes a film 14 and a substrate 18. As will be explained in detail below, the film 14 may be a multi-layered structure which provides a plurality of functional properties (e.g., scratch resistance) and optical properties (e.g., anti-reflection and color neutrality).

The substrate 18 may have opposing major surfaces 18A, 18B. The substrate 18 may also define one or more minor surfaces. For purposes of this disclosure, the term "primary surface" may be one or more of the opposing major surfaces 18A, 18B and/or minor surfaces. According to various examples, the film 14 may be disposed on a primary surface of the substrate 18. The substrate 18 may be a substantially planar sheet, although other examples may utilize a curved or otherwise shaped or sculpted substrate 18. Additionally, or alternatively, the thickness of the substrate 18 may vary along one or more of its dimensions for aesthetic and/or functional reasons. For example, the edges of the substrate 18 may be thicker as compared to more central regions of the glass-based substrate 18, or vice-versa. The length, width and thickness dimensions of the substrate 18 may also vary according to the application or use of the article 10.

As explained above, the article 10 includes the substrate 18 on which the film 14 is positioned or disposed. The substrate 18 may include a glass, a glass-ceramic, a ceramic material and/or combinations thereof. For purposes of this disclosure, the term "glass-based" may mean a glass, a glass-ceramic and/or a ceramic material. As used herein the term "glass-based" is meant to include any material made at least partially of glass, including glass, glass-ceramics, and sapphire. "Glass-ceramics" include materials produced through controlled crystallization of glass. In embodiments, glass-ceramics have about 1% to about 99% crystallinity. Examples of suitable glass-ceramics may include $Li_2O$—$Al_2O_3$—$SiO_2$ system (i.e. LAS-System) glass-ceramics, $MgO$—$Al_2O_3$—$SiO_2$ system (i.e. MAS-System) glass-ceramics, $ZnO \times Al_2O_3 \times nSiO_2$ (i.e. ZAS system), and/or glass-ceramics that include a predominant crystal phase including β-quartz solid solution, β-spodumene, cordierite, and lithium disilicate. The glass-ceramic substrates may be strengthened using the chemical strengthening processes disclosed herein. In one or more embodiments, MAS-System glass-ceramic substrates may be strengthened in $Li_2SO_4$ molten salt, whereby an exchange of $2Li^+$ for $Mg^{2+}$ can occur. According to various examples, the substrate 18 may be a glass-based substrate. In glass-based examples of the substrate 18, the substrate 18 may be strengthened or strong as explained in greater detail below. The substrate 18 may be substantially clear, transparent and/or free from light scattering. In glass-based examples of the substrate 18, the substrate 18 may have a refractive index in the range from about 1.45 to about 1.55. Further, the substrate 18 of the article 10 may include sapphire and/or polymeric materials. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

According to various examples, the substrate 18 can have a thickness ranging from about 50 micrometers (microns or μm) to about 5 millimeters (mm). Exemplary thicknesses of the substrate 18 range from 1 μm to 1000 μm, or 100 μm to 500 μm. For example, the substrate 18 may have a thickness of about 100 μm, 200 μm, 300 μm, 400 μm, 500 μm, 600 μm, 700 μm, 800 μm, 900 μm or 1000 μm According to other examples, the glass-based substrate 18 may have a thickness greater than or equal to about 1 mm, about 2 mm, about 3 mm, about 4 mm, or about 5 mm. In one or more specific examples, the substrate 18 may have a thickness of 2 mm or less or less than 1 mm. The substrate 18 may be acid polished or otherwise treated to remove or reduce the effect of surface flaws.

The substrate 18 may be relatively pristine and flaw-free (for example, having a low number of surface flaws or an average surface flaw size less than about 1 μm). Where strengthened or strong glass-based substrates 18 are utilized, such substrates 18 may be characterized as having a high average flexural strength (when compared to glass-based substrates 18 that are not strengthened or strong) or high surface strain-to-failure (when compared to glass-based substrates 18 that are not strengthened or strong) on one or more major opposing surfaces of such substrates 18.

Suitable substrates 18 may exhibit an elastic modulus (e.g., Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween. The Young's or elastic modulus value for the substrate, recited in this disclosure, refers to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

Glass-based examples of the substrate 18 may be provided using a variety of different processes. For instance, forming methods of the glass-based substrate 18 include float glass processes and down-draw processes such as fusion draw and slot draw.

Once formed, glass-based examples of the substrate 18 may be strengthened to form strengthened glass-based substrates 18. As used herein, the term "strengthened glass-based substrate" will refer to a glass-based substrate 18 that has been strengthened by a post-manufacturing process that adds residual, compressive stress to the substrate 18, for example through ion-exchange of larger alkali metal ions for smaller ions in the surface of the glass-based substrate 18. However, other strengthening methods known in the art, such as thermal tempering, may be utilized to form strengthened examples of the glass-based substrates 18. As will be described, strengthened glass-based substrates include a glass-based substrate 18 having a surface compressive stress in its surface (e.g., at least one of the opposing major surfaces 18A, 18B and/or minor surfaces) and/or its bulk that aids in the strength preservation of the glass-based substrate 18.

As also used herein, "strong" glass-based substrates 18 are within the scope of this disclosure. Strong substrates include glass-based substrates 18 that may or may not have undergone a specific strengthening process to impart residual compressive stress, but are nevertheless subjected to a manufacturing or post-manufacturing process, step or procedure that results in increased average strength, Weibull modulus, and/or strain to failure as compared to a control substrate without the "strong" process, step or procedure. For example, the strong glass-based substrates 18 may be formed with and/or may be polished to have a pristine surface which reduces the average flaw size and/or number of flaws. Such strong glass-based substrates 18 may be defined as glass sheet articles or glass-based substrates having an average strain-to-failure greater than about 0.5%, 0.7%, 1%, 1.5%, or even greater than 2%. Such strong glass-based substrates 18 can be made, for example, by protecting the pristine glass surfaces after melting and forming the glass-based substrate 18. An example of such protection occurs in a fusion draw method, where the surfaces of the glass films do not come into contact with any part of the apparatus or other surface after forming. The glass-based substrates 18 formed from a fusion draw method may derive their strength from their pristine surface quality. A pristine surface quality can also be achieved through etching or polishing and subsequent protection of glass-based substrate surfaces, and other methods known in the art.

In one or more examples, both strengthened glass-based substrates 18 and the strong glass-based substrates 18 may have an average strain-to-failure greater than about 0.5%, 0.7%, 1%, 1.5%, or even greater than 2%, for example when measured using ring-on-ring or ball-on-ring flexural testing.

As mentioned above, the glass-based examples of the substrates 18 employed in the laminate articles 10 described herein (see FIGS. 1A and 1B) may be chemically-strengthened by an ion-exchange process to provide a strengthened glass-based substrate 18. The glass-based substrate 18 may also be strengthened by other methods known in the art, such as thermal tempering. In the ion-exchange process, typically by immersion of the glass-based substrate 18 into a molten salt bath for a predetermined period of time, ions at or near the surface(s) of the glass-based substrate 18 are exchanged for larger metal ions from the salt bath. According to various examples, the temperature of the molten salt bath is about 350° C. to 450° C. and the predetermined time period is about two to about eight hours. The incorporation of the larger ions into the glass-based substrate 18 strengthens the glass-based substrate 18 by creating a compressive stress in a near surface region or in regions at and adjacent to the surface(s) (e.g., the opposing major surfaces 18A, 18B) of the glass-based substrate 18. A corresponding tensile stress is induced within a central region or regions at a distance from the surface(s) of the glass-based substrate 18 to balance the compressive stress. Glass-based substrates 18 utilizing this strengthening process may be described more specifically as chemically-strengthened glass-based substrates 18 or ion-exchanged glass-based substrates 18. Glass-based substrates 18 that are not strengthened may be referred to herein as "non-strengthened" glass-based substrates 18; nevertheless, such "non-strengthened" glass-based substrates may or may not be "strong" substrates as defined earlier in the disclosure.

According to various examples, sodium ions in a strengthened glass-based substrate 18 are replaced by potassium ions from the molten bath, such as a potassium nitrate salt bath, though other alkali metal ions having larger atomic radii, such as rubidium or cesium, can replace smaller alkali metal ions in the glass. In some examples, smaller alkali metal ions in the glass can be replaced by $Ag^+$ ions. Similarly, other alkali metal salts such as, but not limited to, sulfates, phosphates, halides, and the like may be used in the ion-exchange process.

The replacement of smaller ions by larger ions at a temperature below that at which the glass network in the glass-based substrate 18 can relax produces a distribution of ions across the surface(s) of the strengthened glass-based substrate 18 that results in a stress profile. The larger volume of the incoming ions produces a compressive stress (CS) on the surface and tension (central tension, or CT) in the center of the strengthened glass-based substrate 18. The depth of the ion-exchange may be described as the depth within the strengthened glass-based substrate 18 (i.e., the distance from a surface of the glass-based substrate to a central region of the glass-based substrate), at which ion-exchange facilitated by the ion-exchange process takes place. As such, the glass-based substrate 18 may have a compressive stress region.

Strengthened examples of the glass-based substrates 18 can have a surface compressive stress of greater than or equal to about 300 MPa, 400 MPa, 450 MPa, 500 MPa, 550 MPa, 600 MPa, 650 MPa, 700 MPa, 750 MPa or greater than or equal to about 800 MPa. The strengthened glass-based substrate 18 may have a depth-of-compression (i.e., the compressive stress region extends from the primary surface 18A to a first selected depth in the substrate) of from about 15 μm to about 100 μm. In yet other examples, the glass-based substrate 18 may have a depth-of-compression in the glass-based substrate 18 of about 5 μm or greater, 10 μm or greater, 15 μm or greater, 20 μm or greater, 25 μm or greater, 30 μm or greater, 35 μm or greater, 40 μm or greater, 45 μm or greater, or 50 μm or greater. According to various examples, the glass-based substrate 18 may have a depth-of-compression in the glass-based substrate 18 of about 15 μm or greater. A central tension may exist within the glass-based substrate 18 of about 10 MPa or greater, 20 MPa or greater, 30 MPa or greater, 40 MPa or greater, 42 MPa or greater, 45 MPa or greater, or about 50 MPa or greater. The central tension may be less than or equal to about 100 MPa, 95 MPa, 90 MPa, 85 MPa, 80 MPa, 75 MPa, 70 MPa, 65 MPa, 60 MPa, or less than or equal to about 55 MPa. In one or more specific examples, the strengthened glass-based substrate 18 has one or more of the following: a surface compressive stress greater than 500 MPa, a depth-of-compression greater than 15 μm, and a central tension greater than 18 MPa.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. As used herein, DOC means the depth at which the stress in the chemically strengthened alkali-aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Maximum CT values are measured using a scattered light polariscope (SCALP) technique known in the art.

Without being bound by theory, it is believed that strengthened glass-based substrates 18 with a surface compressive stress greater than 500 MPa and a depth-of-compression greater than about 15 μm typically have greater strain-to-failure than non-strengthened glass-based substrates 18 (or, in other words, glass-based substrates that have not been ion-exchanged or otherwise strengthened). According to various examples, the benefits of one or more examples described herein may not be as prominent with non-strengthened or weakly strengthened types of glass-based substrates 18 that do not meet these levels of surface compressive stress or depth-of-compression, because of the presence of handling or common glass surface damage events in many typical applications. In other specific applications where the surfaces of the glass-based substrate 18 can be adequately protected from scratches or surface damage (e.g., by a protective coating or other layers), strong glass-based substrates 18 with a relatively high strain-to-failure can also be created through forming and protection of a pristine glass surface quality, using methods such as the fusion forming method. In these alternate applications, the benefits of one or more examples described herein can be similarly realized.

Exemplary ion-exchangeable glasses that may be used in the strengthened glass-based substrate 18 may include alkali aluminosilicate glass compositions or alkali aluminoborosilicate glass compositions, though other glass compositions are contemplated. As used herein, "ion exchangeable" means that a glass-based substrate 18 is capable of exchanging cations located at or near the surface of the glass-based substrate with cations of the same valence that are either larger or smaller in size. One exemplary glass composition includes $SiO_2$, $B_2O_3$ and $Na_2O$, where $(SiO_2+B_2O_3) \geq 66$ mol. %, and $Na_2O \geq 9$ mol. %. In another example, the glass-based substrate 18 includes a glass composition with at least 6 wt. % aluminum oxide. In another example, a glass-based substrate 18 includes a glass composition with one or more alkaline earth oxides, such that a content of alkaline earth oxides is at least 5 wt. %. Suitable glass compositions, in some examples, further include at least one of $K_2O$, MgO, and CaO. In a specific example, the glass compositions used in the glass-based substrate 18 can include 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further exemplary glass composition suitable for the glass-based substrate 18, which may optionally be strengthened or strong, includes: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further exemplary glass composition suitable for the glass-based examples of the substrate 18, which may optionally be strengthened or strong, includes: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular example, an alkali aluminosilicate glass composition suitable for the glass-based substrate 18, which may optionally be strengthened or strong, includes alumina, at least one alkali metal and, in some embodiments, greater than 50 mol. % $SiO_2$, in other examples at least 58 mol. % $SiO_2$, and in still other examples at least 60 mol. % $SiO_2$, wherein the ratio $$\frac{Al_2O_3 + B_2O_3}{\sum \text{modifiers}} > 1,$$

wherein the ratio the components are expressed in mol. % and the modifiers are alkali metal oxides. This glass composition, in particular examples, includes: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In still another example, the glass-based substrate 18, which may optionally be strengthened or strong, may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

According to various examples, the glass-based examples of the substrate 18, which may optionally be strengthened or strong, may include an alkali silicate glass composition including: 2 mol % or more of $Al_2O_3$ and/or $ZrO_2$, or 4 mol % or more of $Al_2O_3$ and/or $ZrO_2$.

According to various examples, the glass-based examples of the substrate 18 may be batched with 0-2 mol. % of at least one fining agent selected from a group that includes $Na_2SO_4$, NaCl, NaF, NaBr, $K_2SO_4$, KCl, KF, KBr, and $SnO_2$.

Still referring to FIGS. 1A and 1B, the film 14, also referred to herein as a coating, is depicted as positioned directly on the glass-based substrate 18, but it will be understood that one or more layers or films may be positioned between the film 14 and the substrate 18. The film 14 may be positioned on more than one surface of the substrate 18. Further, the film 14 may be positioned on the major opposing surfaces 18A, 18B as well as the minor surfaces of the substrate 18.

The term "film," as applied to the film 14 and/or other films incorporated into the laminated article 10, includes one or more layers that are formed by any known method in the art, including discrete deposition or continuous deposition processes. Such layers may be in direct contact with one another. The layers may be formed from the same material or more than one different material. In one or more alternative examples, such layers may have intervening layers of different materials disposed therebetween. In one or more examples, the film 14 may include one or more contiguous and uninterrupted layers and/or one or more discontinuous and interrupted layers (i.e., a layer having different materials formed adjacent to one another). According to various examples, the film 14 is free of macroscopic scratches or defects that are easily visible to the eye.

As used herein, the term "dispose" includes coating, depositing and/or forming a material onto a surface using any known method in the art. The disposed material may constitute a layer, as defined herein. The phrase "disposed on" includes the instance of forming a material onto a surface such that the material is in direct contact with the surface and also includes the instance where the material is formed on a surface, with one or more intervening material(s) in between the disposed material and the surface. The intervening material(s) may constitute a layer, as defined herein.

The optical film 14 may be formed using various deposition methods such as vacuum deposition techniques, for example, chemical vapor deposition (e.g., plasma-enhanced chemical vapor deposition, low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation, sputtering and/or atomic layer deposition. One or more layers of the optical film 14 may include nano-pores or mixed-materials to provide specific refractive index ranges or values.

The thickness of the film 14 may be in the range from about 0.005 µm to about 0.5 µm, or from about 0.01 µm to about 20 µm. According to other examples, the film 14 may have a thickness in the range from about 0.01 µm to about 10 µm, from about 0.05 µm to about 0.5 µm, from about 0.01 µm to about 0.15 µm or from about 0.015 µm to about 0.2 µm. In yet other examples, the film 14 may have a thickness from about 100 nm to about 200 nm. Thickness of the thin film elements (e.g., crack deflecting layer, crack mitigation layer, scratch-resistant layer, film 14, interrupting layers, spacing layers, bulk layers, first portion, second portion, third portion, etc.) was measured by scanning electron microscope (SEM) of a cross-section, or by optical ellipsometry (e.g., by an n & k analyzer), or by thin film reflectometry. For multiple layer elements (e.g., crack mitigation stack), thickness measurements by SEM are preferred.

The article 10 and/or film 14 may have an average and/or local optical, or light, transmittance in a visible wavelength band (e.g., about 500 nm to about 800 nm) of greater than or equal to about 10% or greater, 20% or greater, 30% or greater, 40% or greater, 50% or greater 60% or greater, about 65% or greater, about 70% or greater, about 75% or greater, about 80% or greater, about 85% or greater, about 90% or greater, about 90.5% or greater, about 91% or greater, about 91.5% or greater, about 92% or greater, about 92.5% or greater, about 93% or greater, about 93.5% or greater, about 94% or greater, about 94.5% or greater, about 95% or greater, about 95.5% or greater, about 96% or greater, about 96.5% or greater, about 97% or greater, about 97.5% or greater, about 98% or greater, about 98.5% or greater, about 99% or greater, or about 99.5% or greater. The term "optical transmittance" refers to the amount of light that is transmitted through a medium. The measure of optical transmittance is the difference between the amount of light that enters the medium and the amount of light that exits the medium. In other words, optical transmittance is the light that has traveled through a medium without being absorbed or scattered. The term "photopic average transmittance" refers to the spectral average of the optical transmission multiplied by the luminous efficiency function, as described by a CIE standard observer. The optical transmittance of the article 10 and/or film 14 may be measured according to standard D1003 of the American Society for Testing and Materials.

The article 10 and/or film 14 may have a haze of less than or equal to about 10%, 9%, 8%, 7%, 6%, 5%, 4%, 3%, 2% or less than or equal to about 1%. Similarly to the optical transmittance, the haze of the article 10 and/or film 14 may be measured according to standard D1003 of the American Society for Testing and Materials.

The article 10 and/or film 14 may have a low visible light reflectance. For example, a photopic average of the reflectance for the film 14 and/or article 10 across the visible wavelength regime (e.g., about 500 nm to about 800 nm) may be about 20% or less, about 10% or less, about 5% or less, about 4.5% or less, about 4% or less, about 3.5% or less, about 3% or less, about 2.5% or less, about 2% or less, about 1.5% or less, about 0.9% or less, about 0.5% or less, about 0.4% or less, or about 0.3% or less. As used herein, photopic reflectance mimics the response of the human eye by weighting the reflectance versus wavelength spectrum according to the human eye's sensitivity. Photopic reflectance may also be defined as the luminance, or tristimulus Y value of reflected light, according to known conventions such as CIE color space conventions. The average photopic reflectance is defined in equation (1) as the spectral reflectance, $R(\lambda)$ multiplied by the illuminant spectrum, $I(\lambda)$ and the CIE's color matching function $\bar{y}(\lambda)$, related to the eye's spectral response:

$$\langle R_p \rangle = \int_{450\ nm}^{650\ nm} R(\lambda) \times I(\lambda) \times \bar{y}(\lambda) d\lambda$$

In some instances, the article 10 including the film 14 may exhibit a color shift of about 10 or less, about 5 or less, or even about 2 or less is exhibited by the article when viewed at various incident illumination angles from normal incidence, under an illuminant. In some instances the color shift is about 1.9 or less, 1.8 or less, 1.7 or less, 1.6 or less, 1.5 or less, 1.4 or less, 1.3 or less, 1.2 or less, 1.1 or less, 1.0 or less, 0.9 or less, 0.8 or less, 0.7 or less, 0.6 or less, 0.5 or less, 0.4 or less, 0.3 or less, 0.2 or less, or 0.1 or less. In some embodiments, the color shift may be about 0. The illuminant can include standard illuminants as determined by the CIE, including A series illuminants (representing tungsten-filament lighting), B series illuminants (representing daylight simulating illuminants), C series illuminants (representing daylight simulating illuminants), D series illuminants (representing natural daylight), and F series illuminants (representing various types of fluorescent lighting). In specific examples, the article 10 exhibits a color shift of about 2 or less when viewed at incident illumination angle from normal incidence under a CIE F2, F10, F11, F12 or D65 illuminant.

The incident illumination angle may be in the range from about 0 degrees to about 80 degrees, from about 0 degrees to about 75 degrees, from about 0 degrees to about 70 degrees, from about 0 degrees to about 65 degrees, from about 0 degrees to about 60 degrees, from about 0 degrees to about 55 degrees, from about 0 degrees to about 50 degrees, from about 0 degrees to about 45 degrees, from about 0 degrees to about 40 degrees, from about 0 degrees to about 35 degrees, from about 0 degrees to about 30 degrees, from about 0 degrees to about 25 degrees, from about 0 degrees to about 20 degrees, from about 0 degrees to about 15 degrees, from about 5 degrees to about 90 degrees, from about 5 degrees to about 80 degrees, from about 5 degrees to about 70 degrees, from about 5 degrees to about 65 degrees, from about 5 degrees to about 60 degrees, from about 5 degrees to about 55 degrees, from about 5 degrees to about 50 degrees, from about 5 degrees to about 45 degrees, from about 5 degrees to about 40 degrees, from about 5 degrees to about 35 degrees, from about 5 degrees to about 30 degrees, from about 5 degrees to about 25 degrees, from about 5 degrees to about 20 degrees, from about 5 degrees to about 15 degrees, and all ranges and sub-ranges therebetween, away from normal incidence.

The article 10 may exhibit the maximum color shifts described herein at and along all the incident illumination angles in the range from about 0 degrees to about 80 degrees away from normal incidence. In one example, the article may exhibit a color shift of 2 or less at any incident illumination angle in the range from about 0 degrees to about 60 degrees, from about 2 degrees to about 60 degrees, or from about 5 degrees to about 60 degrees away from normal incidence. The color shift is given by equation (2):

$$\sqrt{((a^*_2 - a^*_1)^2 + (b^*_2 + (b^*_2 - b^*_1)^2)} \qquad (2)$$

where $a^*_1$ and $b^*_1$ are color coordinates of the article when viewed at normal incidence and $a^*_2$, and $b^*_2$ are color coordinates of the article 10 viewed at the incident illumination angle. The color coordinates of the article 10, when viewed at normal incidence and at the incident illumination angle, are both in transmittance or reflectance.

According to various examples, the coated surface of the article 10 having the film 14 disposed thereon may exhibit a maximum hardness of about 8 GPa or greater, about 9 GPa or greater, about 10 GPa or greater, about 11 GPa or greater, about 12 GPa or greater, about 13 GPa or greater, about 14 GPa or greater, about 15 GPa or greater, about 16 GPa or greater, about 17 GPa or greater, about 18 GPa or greater as measured by Berkovich nanoindentation at indention depths of about 100 nm or greater. Hardness is measured by a "Berkovich Indenter Hardness Test," which includes measuring the hardness of a material on a surface thereof by indenting the surface with a diamond Berkovich indenter.

As used herein, the "maximum hardness value" of the film 14 is reported as measured on an exterior (e.g., top or air) surface of the film 14 using a Berkovich Indenter Hardness Test, and the "maximum hardness value" of the film 14 is reported as measured on the top surface of the film 14 (prior to the application additional layers or structures) using the Berkovich Indenter Hardness Test. More particularly, according to the Berkovich Indenter Hardness Test, hardness of thin film coatings as reported herein was determined using widely accepted nanoindentation practices. See: Fischer-Cripps, A. C., Critical Review of Analysis and Interpretation of Nanoindentation Test Data, Surface & Coatings Technology, 200, 4153-4165 (2006) (hereinafter "Fischer-Cripps"); and Hay, J., Agee, P, and Herbert, E., Continuous Stiffness measurement During Instrumented Indentation Testing, Experimental Techniques, 34 (3) 86-94 (2010) (hereinafter "Hay"). For coatings, it is typical to measure hardness and modulus as a function of indentation depth. So long as the coating is of sufficient thickness, it is then possible to isolate the properties of the coating from the resulting response profiles. It should be recognized that if the coatings are too thin (for example, less than ~500 nm), it may not be possible to completely isolate the coating properties as they can be influenced from the proximity of the substrate which may have different mechanical properties. See Hay. The methods used to report the properties herein are representative of the coatings themselves. The process is to measure hardness and modulus versus indentation depth out to depths approaching 1000 nm. In the case of hard coatings on a softer glass, the response curves will reveal maximum levels of hardness and modulus at relatively small indentation depths (less than or equal to about 200 nm). At deeper indentation depths both hardness and modulus will gradually diminish as the response is influenced by the softer glass substrate. In this case the coating hardness and modulus are taken be those associated with the regions exhibiting the maximum hardness and modulus. In the case of soft coatings on a harder glass substrate, the coating properties will be indicated by lowest hardness and modulus levels that occur at relatively small indentation depths. At deeper indentation depths, the hardness and modulus will gradually increase due to the influence of the harder glass. These profiles of hardness and modulus versus depth can be obtained using either the traditional Oliver and Pharr approach (see Fischer-Cripps) or by the more efficient continuous stiffness approach (see Hay).

Figure 11:
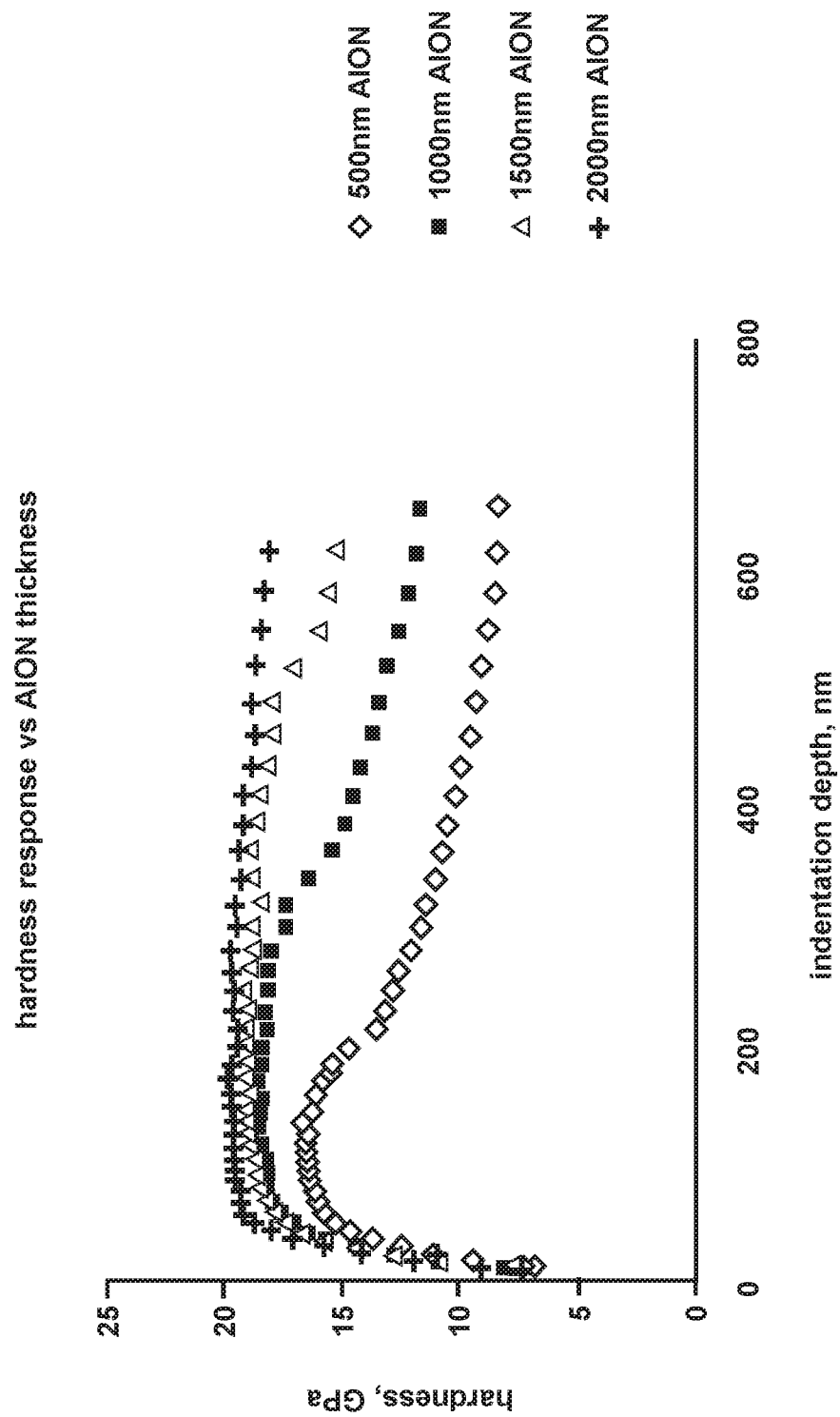
FIG. 11 is a plot of hardness versus indentation depth for various thicknesses of film on a substrate.

For example, FIG. 11 illustrates the changes in measured hardness value as a function of indentation depth and thickness of a coating. As shown in FIG. 11, the hardness measured at intermediate indentation depths (at which hardness approaches and is maintained at maximum levels) and at deeper indentation depths depends on the thickness of a material or layer. FIG. 11 illustrates the hardness response of four different layers of $AlO_xN_y$ having different thicknesses. The hardness of each layer was measured using the Berkovich Indenter Hardness Test. The 500 nm thick layer exhibited its maximum hardness at indentation depths from about 100 nm to 180 nm, followed by a dramatic decrease in hardness at indentation depths from about 180 nm to about 200 nm, indicating the hardness of the substrate influencing the hardness measurement. The 1000 nm thick layer exhibited a maximum hardness at indentation depths from about 100 nm to about 300 nm, followed by a dramatic decrease in hardness at indentation depths greater than about 300 nm. The 1500 nm thick layer exhibited a maximum hardness at indentation depths from about 100 nm to about 550 nm and the 2000 nm thick layer exhibited a maximum hardness at indentation depths from about 100 nm to about 600 nm. Although FIG. 11 illustrates a thick single layer, the same behavior is observed in thinner coatings and those including multiple layers such as the film 14 of the embodiments described herein.

The elastic modulus and hardness values reported herein for such thin films were measured using the diamond nanoindentation methods, as described above, with a Berkovich diamond indenter tip.

According to various examples, the film 14 includes a first portion 14A disposed over the primary surface 18A, one or more interrupting layers 14B disposed over the first portion 14A, and a second portion 14C disposed over the one or more interrupting layers 14B. It will be understood that the alternating structure of portions 14A, 14C and interrupting layers 14B may be repeated a plurality of times through the film 14. For example, an example of the film 14 in FIG. 1B provides a third portion 14D over a second set of the interrupting layers 14B. The film 14 may further incorporate a plurality of impedance matching layers 22 and/or anti-reflection layers 26. As is understood in the art, the impedance matching layers 22 may be configured to reduce reflection of light by the film 14 back into the glass-based substrate 18. Each of the first, second and third portions 14A, 14C, 14D may further include a bulk layer 30. The film 14 defines a film surface 14E positioned on either an exterior surface of the anti-reflective film 26 or the bulk layer 30. As will be explained in greater detail below, the microstructure of the film 14 may be controlled or otherwise modified to adjust a roughness of the surface 14E. An easy-to-clean (ETC) coating 34 may be positioned on the surface 14E of the film 14. As will be explained in greater detail below, control of the roughness of the surface 14E may affect the durability of the ETC coating 34.

As shown in FIGS. 1A and 1B, the optical film 14 includes the anti-reflective coating 26, which may include a plurality of layers (26A, 26B). In one or more examples, the anti-reflective coating 26 may include a period including two or more layers. In one or more examples, the two or more layers may be characterized as having different refractive indices (RI) from each another. According to various examples, the period includes a first low RI layer 26A and a second high RI layer 26B. The difference in the refractive index of the first low RI layer and the second high RI layer may be about 0.01 or greater, 0.05 or greater, 0.1 or greater or even 0.2 or greater. The anti-reflective coating 26 may include an additional capping layer, which may include a lower refractive index material than the second high RI layer 26B.

The anti-reflective coating 26 may include a plurality of periods. A single period includes include a first low RI layer 26A and a second high RI layer 26B, such that when a plurality of periods are provided, the first low RI layer 26A and the second high RI layer 26B alternate in a repeating sequence, such that the first low RI layer 26A and the second high RI layer 26B appear to alternate along the physical thickness of the anti-reflective coating 26. The anti-reflective coating 26 may include from about 1 to about 25 periods, about 2 to about 20 periods, from about 2 to about 15 periods, from about 2 to about 10 periods, from about 2 to about 12 periods, from about 3 to about 8 periods, from about 3 to about 6 periods.

In some examples, the period may include one or more third layers. The third layer(s) may have a low RI, a high RI or a medium RI. In some examples, the third layer(s) may have the same RI as the first low RI layer 26A or the second high RI layer 26B. In other examples, the third layer(s) may have a medium RI that is between the RI of the first low RI layer 26A and the RI of the second high RI layer 26B. Alternatively, the third layer(s) may have a refractive index greater than the second high RI layer 26B.

As used herein, the terms "low RI," "high RI" and "medium RI" refer to the relative values for the RI to another (e.g., low RI<medium RI<high RI). In one or more examples, the term "low RI" when used with the first low RI layer 26A or with the third layer, includes a range from about 1.3 to about 1.7 or 1.75. In one or more examples, the term "high RI" when used with the second high RI layer 26B or with the third layer, includes a range from about 1.7 to about 2.5 (e.g., about 1.85 or greater). In some examples, the term "medium RI" when used with the third layer, includes a range from about 1.55 to about 1.8. In some instances, the ranges for low RI, high RI and medium RI may overlap; however, in most instances, the layers of the anti-reflective coating 26 have the general relationship regarding RI of: low RI<medium RI<high RI.

Exemplary materials suitable for use in the anti-reflective coating 26 include: $SiO_2$, $Al_2O_3$, $GeO_2$, SiO, $AlO_xN_y$, AlN, $SiN_x$, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, and/or $CeF_3$ in which x, y, u and v may be integers having a value of from about 1 to about 10. Further examples of a material suitable for use in the anti-reflective coating 26 include polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in the ETC coating 34, and other materials known in the art. Some examples of suitable materials for use in the first low RI layer 26A include $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of the materials for use in the first low RI layer 26A may be minimized (e.g., in materials such as $Al_2O_3$ and $MgAl_2O_4$). Some examples of suitable materials for use in the second high RI layer 26B include $Si_uAl_vO_xN_y$, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, $MoO_3$, polysilicon, indium-tin-oxide, diamond, nanocrystalline diamond, and diamond-like carbon. The oxygen content of the materials for the second high RI layer 26B may be minimized, especially in $SiN_x$ or AlN), materials. $AlO_xN_y$ materials may be considered to be oxygen-doped $AlN_x$, that is they may have an $AlN_x$, crystal structure (e.g., wurtzite) and need not have an AlON crystal structure.

As used herein, the "$AlO_xN_y$," "$SiO_xN_y$," and "$Si_uAl_xO_yN_z$" materials in the disclosure include various aluminum oxynitride, silicon oxynitride and silicon aluminum oxynitride materials, as understood by those with ordinary skill in the field of the disclosure, described according to certain numerical values and ranges for the subscripts, "u," "x," "y," and "z". That is, it is common to describe solids with "whole number formula" descriptions, such as $Al_2O_3$. It is also common to describe solids using an equivalent "atomic fraction formula" description such as $Al_{0.4}O_{0.6}$, which is equivalent to $Al_2O_3$. In the atomic fraction formula, the sum of all atoms in the formula is 0.4+0.6=1, and the atomic fractions of Al and O in the formula are 0.4 and 0.6 respectively. Atomic fraction descriptions are described in many general textbooks and atomic fraction descriptions are often used to describe alloys. See, for example: (i) Charles Kittel, Introduction to Solid State Physics, seventh edition, John Wiley & Sons, Inc., NY, 1996, pp. 611-627; (ii) Smart and Moore, Solid State Chemistry, An introduction, Chapman & Hall University and Professional Division, London, 1992, pp. 136-151; and (iii) James F. Shackelford, Introduction to Materials Science for Engineers, Sixth Edition, Pearson Prentice Hall, N.J., 2005, pp. 404-418.

Again referring to the "$AlO_xN_y$," "$SiO_xN_y$," and "$Si_uAl_xO_yN_z$" materials in the disclosure, the subscripts allow those with ordinary skill in the art to reference these materials as a class of materials without specifying particular subscript values. To speak generally about an alloy, such as aluminum oxide, without specifying the particular subscript values, we can speak of $Al_vO_x$. The description $Al_vO_x$ can represent either $Al_2O_3$ or $Al_{0.4}O_{0.6}$. If v+x were chosen to sum to 1 (i.e., v+x=1), then the formula would be an atomic fraction description. Similarly, more complicated mixtures can be described, such as $Si_uAl_vO_xN_y$, where again, if the sum u+v+x+y were equal to 1, we would have the atomic fractions description case.

Once again referring to the "$AlO_xN_y$," "$SiO_xN_y$," and "$Si_uAl_xO_yN_z$" materials in the disclosure, these notations allow those with ordinary skill in the art to readily make comparisons to these materials and others. That is, atomic fraction formulas are sometimes easier to use in comparisons. For instance; an example alloy consisting of $(Al_2O_3)_{0.3}(AlN)_{0.7}$ is closely equivalent to the formula descriptions $Al_{0.448}O_{0.31}N_{0.241}$ and also $Al_{367}O_{254}N_{198}$. Another example alloy consisting of $(Al_2O_3)_{0.4}(AlN)_{0.6}$ is closely equivalent to the formula descriptions $Al_{0.438}O_{0.375}N_{0.188}$ and $Al_{37}O_{32}N_{16}$. The atomic fraction formulas $Al_{0.448}O_{0.31}N_{0.241}$ and $Al_{0.438}O_{0.375}N_{0.188}$ are relatively easy to compare to one another. For instance, Al decreased in atomic fraction by 0.01, O increased in atomic fraction by 0.065 and N decreased in atomic fraction by 0.053. It takes more detailed calculation and consideration to compare the whole number formula descriptions $Al_{367}O_{254}N_{198}$ and $Al_{37}O_{32}N_{16}$. Therefore, it is sometimes preferable to use atomic fraction formula descriptions of solids. Nonetheless, the use of $Al_yO_xN_y$ is general since it captures any alloy containing Al, O and N atoms.

As understood by those with ordinary skill in the field of the disclosure with regard to any of the foregoing materials (e.g., AlN) for the optical film 14, each of the subscripts, "u," "x," "y," and "z," can vary from 0 to 1, the sum of the subscripts will be less than or equal to one, and the balance of the composition is the first element in the material (e.g., Si or Al). In addition, those with ordinary skill in the field can recognize that "$Si_uAl_xO_yN_z$" can be configured such that "u" equals zero and the material can be described as "$AlO_xN_y$". Still further, the foregoing compositions for the optical film 14 exclude a combination of subscripts that would result in a pure elemental form (e.g., pure silicon, pure aluminum metal, oxygen gas, etc.). Finally, those with ordinary skill in the art will also recognize that the foregoing compositions may include other elements not expressly denoted (e.g., hydrogen), which can result in non-stoichiometric compositions (e.g., $SiN_x$ vs. $Si_3N_4$). Accordingly, the foregoing materials for the optical film 14 can be indicative of the available space within a $SiO_2$—$Al_2O_3$—$SiN_x$—AlN or a $SiO_2$—$Al_2O_3$—$Si_3N_4$—AlN phase diagram, depending on the values of the subscripts in the foregoing composition representations.

In one or more examples at least one of the layer(s) of the anti-reflective coating 26 may include a specific optical thickness range. As used herein, the term "optical thickness" is determined by (n*d), where "n" refers to the RI of the sub-layer and "d" refers to the physical thickness of the layer. In one or more examples, at least one of the layers of the anti-reflective coating 26 may include an optical thickness in the range from about 2 nm to about 200 nm, from about 10 nm to about 100 nm, from about 15 nm to about 100 nm, from about 15 to about 500 nm, or from about 15 to about 5000 nm. In some examples, all of the layers in the anti-reflective coating 26 may each have an optical thickness in the range from about 2 nm to about 200 nm, from about 10 nm to about 100 nm, from about 15 nm to about 100 nm, from about 15 to about 500 nm, or from about 15 to about 5000 nm. In some cases, at least one layer of the anti-reflective coating 26 has an optical thickness of about 50 nm or greater. In some cases, each of the first low RI layers 26A have an optical thickness in the range from about 2 nm to about 200 nm, from about 10 nm to about 100 nm, from about 15 nm to about 100 nm, from about 15 to about 500 nm, or from about 15 nm to about 5000 nm. In other cases, each of the second high RI layers 26B have an optical thickness in the range from about 2 nm to about 200 nm, from about 10 nm to about 100 nm, from about 15 nm to about 100 nm, from about 15 to about 500 nm, or from about 15 to about 5000 nm.

In one or more examples, the anti-reflective coating 26 has a physical thickness of about 800 nm or less. The anti-reflective coating 26 may have a physical thickness in the range from about 10 nm to about 800 nm, from about 50 nm to about 800 nm, from about 100 nm to about 800 nm, from about 150 nm to about 800 nm, from about 200 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 50 to about 300, and all ranges and sub-ranges therebetween.

In some examples, the anti-reflective coating 26, and therefore the film 14, exhibits an average light reflectance of about 9% or less, about 8% or less, about 7% or less, about 6% or less, about 5% or less, about 4% or less, about 3% or less, or about 2% or less over the optical wavelength regime, when measured at the anti-reflective coating 26 only (e.g., when removing the reflections from an uncoated back surface of the article 10, such as through using index-matching oils on the back surface coupled to an absorber, or other known methods). The average reflectance (which may be a photopic average) may be in the range from about 0.4% to about 9%, from about 0.4% to about 8%, from about 0.4% to about 7%, from about 0.4% to about 6%, or from about 0.4% to about 5% and all ranges therebetween.

In some instances, the anti-reflective coating 26 may exhibit such average light reflectance over other wavelength ranges such as from about 420 nm to about 650 nm, from about 420 nm to about 680 nm, from about 420 nm to about 700 nm, from about 420 nm to about 740 nm, from about 420 nm to about 850 nm, or from about 420 nm to about 950 nm. In some examples, the anti-reflective coating 26 exhibits an average light transmission of about 90% or greater, 92% or greater, 94% or greater, 96% or greater, or 98% or greater, over the optical wavelength regime. Unless otherwise specified, the average reflectance or transmittance is measured at an incident illumination angle from about 0 degrees to about 10 degrees (however, such measurements may be provided at incident illumination angles of 45 degrees or 60 degrees).

According to various embodiments of the film 14 employing the interrupting layers 14B, the interrupting layers 14B can also be used to tailor roughness and provide high transparency for wavelengths outside the visible range (e.g., in the infrared or in other wavelength ranges). The optical interference design of the interrupting layers 14B can be tuned to provide infrared transparency while controlling the microstructure of the film 14. For example, film 14 may have a transmittance greater than 10%, greater than 20%, greater than 50%, or even greater than 80% for infrared wavelength ranges of interest such as about 750 nm to about 2000 nm, about 750 to about 950 nm, about 900 to about 1200 nm, about 1150 nm to about 1400 nm, about 1350 nm to about 1650 nm, about 1000 nm to about 2000 nm, and all ranges and subranges therein.

As explained above, in examples of the laminate article 10 including the anti-reflective coating 26, the surface 14E of the film 14 may be defined by the anti-reflective coating 26. The anti-reflective coating 26 may have substantially the same crystal structure and crystallite size as the bulk layer 30 on which the anti-reflective coating 26 is positioned. As such, it may be advantageous to control the crystallite size of the bulk layer 30 such that the crystallite size of the anti-reflective film 26 is controlled. In examples of the laminate article 10 not including the anti-reflective layer 26, the surface 14E on which the ETC coating 34 is positioned may be defined by one of the bulk layers 30.

The first, second and/or third portions 14A, 14C, 14D may have a thickness from about 50 nm to about 10 µm, or from about 0.1 µm to about 5 µm, or from about 0.1 µm to about 2 µm. The first, second and/or third portions 14A, 14C, 14D may have a may have an average and/or local optical, or light, transmittance in a visible wavelength band (e.g., about 500 nm to about 800 nm) of greater than or equal to about 10% or greater, about 20% or greater, about 30% or greater, about 40% or greater, about 50% or greater, about 60% or greater, about 65% or greater, about 70% or greater, about 75% or greater, about 80% or greater, about 85% or greater, about 90% or greater, about 90.5% or greater, about 91% or greater, about 91.5% or greater, about 92% or greater, about 92.5% or greater, about 93% or greater, about 93.5% or greater, about 94% or greater, about 94.5% or greater, about 95%, about 95.5% or greater, about 96% or greater, about 96.5% or greater, about 97% or greater, about 97.5% or greater, about 98% or greater, about 98.5% or greater, about 99% or greater, or about 99.5% or greater. It will be understood that the transmittance of the first, second and/or third portions 14A, 14C, 14D may also apply for the bulk layers 30 individually.

The bulk layer 30 of the first, second and third portions 14A, 14C, 14D may be composed of $AlN_x$, $AlO_xN_y$, AlN, $Si_3N_4$, $SiO_xN_y$, $Si_uAl_vO_xN_y$, $Al_2O_3$, $ZrO_2$, other optically transparent and hard materials and/or combinations thereof. It will be understood that u, x, y, and v may be integers having a value of from about 1 to about 10. According to various examples, the materials of the bulk layers 30 may include a polycrystalline or semi-crystalline crystal structure. It will be understood that each of the bulk layers 30 may include the same or a different material as the other bulk layers 30. For example the first, second and third portions 14A, 14C, 14D of the film 14 may include a polycrystalline or semi-crystalline material including $AlO_xN_y$, where x (representing the molar fraction of oxygen relative to aluminum) is from about 0.02 to about 0.25; and where y (representing the molar fraction of nitrogen relative to aluminum) is from about 0.75 to about 0.98.

The bulk layers 30 may have a thickness of about 100 nm or greater, about 200 nm or greater, about 300 nm or greater, about 400 nm or greater, about 500 nm or greater, about 600 nm or greater, about 700 nm or greater, about 800 nm or greater, about 900 nm or greater, about 1000 nm or greater, about 1100 nm or greater, about 1200 nm or greater, about 1300 nm or greater, about 1400 nm or greater or about 1500 nm or greater. Each of the bulk layers 30 may have the same thickness or a different thickness. According to various examples, the bulk layers 30 may constitute a portion, a majority or substantially all of the first, second or third portions 14A, 14C, 14D. For example, the bulk layers 30 may constitute about 10% or greater, about 20% or greater, about 30% or greater, about 40% or greater, about 50% or greater, about 60% or greater, about 70% or greater, about 80% or greater, about 90% or greater, about 95% or greater, or about 99% or greater of a total thickness of the first, second or third portions 14A, 14C, 14D.

According to various examples, one or more of the bulk layers 30 are in contact with at least one of the interrupting layers 14B. The film 14 may include a single or a plurality of interrupting layers 14B. The interrupting layers 14B may be uniformly or non-uniformly dispersed throughout the film 14, or may be grouped. In the depicted examples, the interrupting layers 14B are positioned in groups, or sequences of three with spacing layers 38 positioned between the interrupting layers 14B. It will be understood that grouped examples of the interrupting layers 14B may include 2, 4, 5, 6, 7, 8, 9, 10 or more interrupting layers 14B without departing from the teachings provided herein.

The spacing layers 38 may have a thickness of about 100 nm or less, 90 nm or less, 80 nm or less, 70 nm or less, 60 nm or less, 50 nm or less, 40 nm or less, 30 nm or less, 20 nm or less, 10 nm or less, 9 nm or less, 8 nm or less, 7 nm or less, 6 nm or less, 5 nm or less, 4 nm or less, 3 nm or less, 2 nm or less, or 1 nm or less. The spacing layers 38 may be composed of $AlN_n$, $AlO_xN_y$, AlN, $Si_3N_4$, $SiO_xN_y$, $Si_uAl_vO_xN_y$, $ZrO_2$, $Al_2O_3$, $SiO_2$ and/or combinations thereof. It will be understood that x, y, u and v may be integers having a value of from about 1 to about 10. Although depicted as including a single spacing layer 38 separating the interrupting layers 14B, it will be understood that each of spacing layers 38 may be composed of several sub-layers and/or that multiple spacing layers 38 separate the interrupting layers 14B.

According to various examples, one or more of the interrupting layers 14B may have a microstructure different than one of the first, second and third portions 14A, 14C, 14D. For example, the first, second and third portions 14A, 14C, 14D may have a crystalline, polycrystalline and/or semi-crystalline microstructure while the one or more of the interrupting layers 14B may have a different crystalline, polycrystalline, semi-crystalline, porous and/or amorphous microstructure. Such a feature may be advantageous in decreasing the average grain, or crystallite, size of the bulk layer 30 grown on top of the interrupting layer 14B. For example, by forming, depositing, and/or growing one of the bulk layers 30 on one of the interrupting layers 14B, the different microstructure of the interrupting layer 14B relative to the bulk layer 30 may result in a fine crystallite size of polycrystalline and/or semi-crystalline examples of the bulk layer 30. Use of the interrupting layers 14B to separate the bulk layers 30 of the various portions 14A, 14C, 14D, the average crystallite size at the surface 14E of the film 14 may be reduced.

According to various examples, the mechanical properties of the interrupting layers 14B may be different than that of the bulk layers 30 and/or first, second and third portions 14A, 14C, 14D (e.g., due to a difference in microstructure and/or material). As such, the mechanical properties of the article 10 can be controlled by the selection of the microstructure of the interrupting layers 14B. For example, if the interrupting layers 14B are configured to have a porous microstructure which has a lower mechanical strength than the first, second or third portions 14A, 14C, 14D, the interrupting layers 14B may function as a crack deflecting layer which may modify the fracture behavior of the article 10.

The interrupting layers 14B may have a thickness of about 100 nm or less, 90 nm or less, 80 nm or less, 70 nm or less, 60 nm or less, 50 nm or less, 40 nm or less, 30 nm or less, 20 nm or less, 10 nm or less, 9 nm or less, 8 nm or less, 7 nm or less, 6 nm or less, 5 nm or less, 4 nm or less, 3 nm or less, 2 nm or less, or 1 nm or less. According to yet another example, one or more of the interrupting layers 14B may have a thickness of about 1 nm or greater, about 2 nm or greater, about 3 nm or greater, about 4 nm or greater, about 5 nm or greater, about 6 nm or greater, about 7 nm or greater, about 8 nm or greater, about 9 nm or greater, about 10 nm or greater, about 20 nm or greater, about 30 nm or greater, about 40 nm or greater or about 50 nm or greater. The thickness of the interrupting layers 14B may all be the same or may be different. As the interrupting layers 14B may be thin relative to the bulk layers 30 of the film 14, the interrupting layers 14B, individually or as a whole, may account for a thickness which is about 20% or less, about 19% or less, about 18% or less, about 17% or less, about 16% or less, about 15% or less, about 14% or less, about 13% or less, about 12% or less, about 11% or less, about 10% or less, about 9% or less, about 8% or less, about 7% or less, about 6% or less, about 5% or less, about 4% or less, about 3% or less, about 2% or less, or about 1% or less of a total thickness of the film 14 or of any of the first, second and/or third portions 14A, 14C, 14D. As the interrupting layers 14B constitute a relatively low total thickness of the film 14, the optical and/or mechanical properties of the bulk layers 30 may dominate the optical and/or mechanical properties of the film 14. In other words, the thinness of the interrupting layers 14B allows the bulk layers 30 to dominate the optical and/or mechanical properties of the film 14.

As explained above, the interrupting layers 14B may be composed of a material having a different microstructure than the bulk layers 30. The interrupting layers 14B may include metals, insulators and/or carbonaceous materials (e.g., amorphous carbon, DLC, C-70, and/or graphitic material) as well as carbide films such as tungsten carbide or SiC may also be utilized. According to some examples, the interrupting layers 14B may be composed of thin metal films such as W and/or Mo. According to yet other examples, non-metallic materials may be used for the interrupting layers 14B such as $Al_2O_3$, $TiO_2$, $SiO_2$, $Nb_2O_5$, SiOC, $SiN_x$, AlN, and $Y_2O_3$—$ZrO_2$. Other oxides, nitrides, or oxycarbides may also be utilized in the interrupting layers 14B. The interrupting layers 14B may be applied to the bulk layer 30 via electrostatic deposition and/or any of the method described above in connection with the film 14. Materials such as $Al_2O_3$ can be crystalline or amorphous depending on film deposition process, plasma energy, ionization and temperature. In some cases, the interrupting layers 14B may have the same chemical composition as the bulk layers 30, but using changes in deposition process, the bulk layers 30 may have a higher density and/or crystallinity than the interrupting layers 14B (i.e., a different microstructure). Amorphous $Al_2O_3$ and $SiO_2$ film examples of the interrupting layers 14B may be formed via a reactive sputtering process.

The interrupting layers 14B can have a refractive index that is substantially different (e.g., about 0.1 index units difference or greater, about 0.5 index units difference or greater, about 1.0 index units difference or greater) than the bulk layers 30 of the first, second and/or third portions 14A, 14C, 14D while still maintaining very high optical transmission through layer design. For example, the interrupting layers 14B may have a refractive index difference from the bulk 30 and/or spacing layers of about 0.12 or greater, 0.15 or greater, 0.2 or greater, 0.3 or greater, or 0.4 or greater at a wavelength of 550 nm. The interrupting layers 14B may have an average and/or local optical, or light, transmittance in a visible wavelength band (e.g., about 450 nm to about 650 nm) of greater than or equal to about 10% or greater, about 20% or greater, about 30% or greater, about 40% or greater, about 50% or greater, about 60% or greater, about 65% or greater, about 70% or greater, about 75% or greater, about 80% or greater, about 85% or greater, about 90% or greater, about 90.5% or greater, about 91% or greater, about 91.5% or greater, about 92% or greater, about 92.5% or greater, about 93% or greater, about 93.5% or greater, about 94% or greater, about 94.5% or greater, about 95%, about 95.5% or greater, about 96% or greater, about 96.5% or greater, about 97% or greater, about 97.5% or greater, about 98% or greater, about 98.5% or greater, about 99% or greater, or about 99.5% or greater. The refractive index contrast of the interrupting layers 14B and the bulk layers 30 may generally be high, necessitating careful optical design and layer thickness control in order to obtain the desired optical transmittance.

As explained above, the interrupting layers 14B are configured to modify the crystal growth behavior of the bulk layers 30 of the first, second and/or third portions 14A, 14C, 14D. For example, as the bulk layer 30 (e.g., polycrystalline and/or semi-crystalline $Al_2O_3$, $ZrO_2$, or $AlO_xN_y$) of the first portion 14A is grown and/or deposited (e.g., through vapor deposition), the bulk layer 30 undergoes a coarsening of the grains of the bulk layer 30. In other words, the bulk layer 30 begins with a fine grain size, and as deposition of the bulk layer 30 continues, the crystal grains grow in a columnar direction and become larger thereby enveloping other smaller crystals. Left unchecked, the surface of the film 14 may exhibit high roughness due to the presence of large crystals or coarse grains of crystals. Such an outcome may be disadvantageous in that films, coatings and layers applied to the coarse surface of the film 14 may exhibit the same roughness and experience detrimental mechanical properties (high friction, poor wearing tolerance, etc.) as a result. As such, by introducing the interrupting layers 14B, which have a different microstructure than the bulk layers 30, the growth of the large crystals may be interrupted, disrupted, or reset. Interrupting, or resetting, of the growth point for the bulk layers 30 allows the grain size for the bulk layers 30 to begin again with fine grains. Use of the interrupting layers 14B may allow the second or third portions 14C, 14D of the film 14 within about 100 nm from the interrupting layers 14B to have an average microstructural crystal size that is smaller than an average microstructural crystal size of the first portion 14A within about 100 nm from the interrupting layers 14B. The fine grain structure can be achieved while simultaneously retaining other product or process advantages, such as high hardness, high toughness, high film density, high optical transparency, or high deposition rate of the film 14.

Use of the interrupting layers 14B may decrease a final grain or crystallite size of the bulk layers 30 and/or the anti-reflective coating 26. Such decrease in the average grain size may result in a surface roughness which is low enough to minimize effects on the ETC coating 34. "Roughness," "average surface roughness (Ra)," or like terms refer to, on a microscopic level or below, an uneven or irregular surface condition, such as an average root mean squared (RMS) roughness (Rq). Ra is calculated as the roughness average of a surface's measured microscopic peaks and valleys. Rq is calculated as the RMS of a surfaces measured microscopic peaks and valleys. When described in terms of Rq, the roughness may be about 20 nanometers or less, about 19 nm or less, about 18 nm or less, about 17 nm or less, about 16 nm or less, about 15 nm or less, about 14 nm or less, about 13 nm or less, about 12 nm or less, about 11 nm or less, about 10 nm or less, about 9 nm or less, about 8 nm or less, about 7 nm or less, about 6 nm or less, about 5 nm or less, about 4 nm or less, about 3 nm or less, about 2 nm or less or about 1 nm or less. When described in terms of Ra, the roughness may be about 20 nm or less, about 19 nm or less, about 18 nm or less, about 17 nm or less, about 16 nm or less, about 15 nm or less, about 14 nm or less, about 13 nm or less, about 12 nm or less, about 11 nm or less, about 10 nm or less, about 9 nm or less, about 8 nm or less, about 7 nm or less, about 6 nm or less, about 5 nm or less, about 4 nm or less, about 3 nm or less, about 2 nm or less or about 1 nm or less.

Positioned on top of the anti-reflective layer 26 of the second and third portions 14C, 14D of the film 14 is the ETC coating 34. According to various examples, the ETC coating 34 includes a fluorinated material (e.g., a perfluoropolyether (PFPE) silane, a pefluoroalkylether, a PFPE oil or other suitable fluorinated material). According to some examples, the thickness of the ETC coating 34 is from about 1 nm to about 20 nm. In other aspects, the thickness of the ETC coating 34 ranges from 1 nm to about 200 nm, 1 nm to about 100 nm, and 1 nm to about 50 nm. In some examples, the ETC coating 34 may have a thickness from about 0.5 nm to about 50 nm, from about 1 nm to about 25 nm, from about 4 mil to about 25 mil, or from about 5 nm to about 20 mil. In other examples, the ETC coating 34 may have a thickness from about 10 nm to about 50 nm.

Various source materials can be used to form the ETC coating 34. ETC coating source materials may include perfluoropolyether (PFPE) silanes, perfluoropolyether (PFPEs) alkoxy silanes, copolymers of these PFPEs and mixtures of these PFPEs. For example, the ETC coating 34 can include a perfluoropolyether (PFPE) silane of formula $[CF_3CF_2CF_2O)_a]_y SiX_{4-y}$ where a is from 5 to 50, y=1 or 2, and X is —Cl, acetoxy, —$OCH_3$ or $OCH_2H_3$, wherein the total perfluoropolyether chain length is 6-130 carbon atoms from the silicon atom to the end of the chain at its greatest length. In other aspects, "a" in the above formula can range from about 10 to 30. Further, it should be understood that the above PEPE formula is one of many types of PFPE suitable for use in the ETC coatings 34 of the disclosure; consequently, it is offered as all exemplary chemistry that is in no way intended to limit the formulas or mixtures of formulas suitable for the ETC coatings 34 of the disclosure. As such, other PFPEs can be employed in the ETC coatings 34 that vary in the structure of the perfluoropolyether chain and/or attachment chemistry relative to the exemplary form provided above. For example, an Optool™ UF503 fluorinated coating material from Daikin Industries is another suitable PIPE that can be employed for the ETC coating 34. As used herein, the length of the carbon chain in nanometers is the product of the number of carbon-carbon bonds along the greatest length of the chain multiplied by the carbon-carbon single bond length of 0.154 nm. In some examples, the carbon chain length of the perfluoropolyether (PFPE) group can range from about 0.1 mu to about 50 nm, from about 0.5 nm to about 25 nm, or from about 1 nm to about 20 nm.

As also noted earlier, examples of the ETC coating 34 can include a PFPE oil. According to some examples, the PEPE oil employed in the ETC coating 34 can be solubilized in an FTC component hound directly to the optical film 14. In general, PEPE oils are characterized by oxidation resistance. In other aspects, the PFPE oil of the ETC coating 34 is a discrete layer disposed over an ETC component bound directly to the optical film 14 and/or bulk layer 30. In further aspects, the PFPE oil of the ETC coating 34 is a combination of solubilized and discrete layers. According to some examples, the PEPE oil employed in the ETC coating 34 can include a Solvay Fomblin® Z type oil, a Fomblin® Y type oil, a Fomblin® K type oil, a Krytox™ K type oil from The Chemours Company, a Demnum™ type oil from Daikin Industries or other similar PEPE oil.

According to various examples, the ETC coating 34 is characterized by a high durability. Accordingly, some examples of an exposed surface of the ETC coating 34 have an average contact angle with water of 70° or more after being subjected to 2000 reciprocating cycles under a load of 1 kg, according to a Steel Wool Test (i.e., as described below). The exposed surface of the ETC coating 34 can also include an average contact angle with water of 70° or more after being subjected to 3500 reciprocating cycles under a load of 1 kg according to the Steel Wool Test. In other aspects, an average contact angle of 70° or more, 75°, 80°, 85°, 90°, 95°, 100°, 105°, 110°, or 115° (including all average contact angles between these levels) with water is retained by the exposed surface of the ETC coating 34 after 2000, or 3500, of such cycles according to the Steel Wool Test.

As used herein, the "Steel Wool Test" is a test employed to determine the durability of an ETC coating 34 disposed over a glass, glass-ceramic or ceramic substrate (e.g., glass-based substrate 18) employed in the articles of the disclosure. At the beginning of a Steel Wool Test, a water contact angle is measured on the particular sample one or more times to obtain a reliable initial water contact angle. These water contact angle measurements were conducted using a Krüss GmbH DSA100 drop shape analyzer or similar instrument. After the initial water contact angle is measured, a pad of Bonstar #0000 steel wool is affixed to an arm of a Taber® Industries 5750 linear abraser instrument. The steel wool pad is then allowed to make contact with the sample (on the ETC coating 34) under a load of 1 kg and set to reciprocate at 60 cycles/min. The average contact angle is then measured on the sample after 2000 cycles, 3500 cycles and/or another specified duration.

According to various examples, the article 10 can have a haze through the ETC coating 34 and the glass, glass-ceramic or ceramic substrate 18 of less than or equal to about 5 percent. In certain aspects, the haze is equal to or less than 5 percent, 4.5 percent, 4 percent, 3.5 percent, 3 percent, 2.5 percent, 2 percent, 1.5 percent, 1 percent, 0.75 percent, 0.5 percent, or 0.25 percent or less (including all levels of haze between these levels) through the ETC coating 34 and the glass-based substrate 18. In other instances, examples of the article 10 that incorporate appreciable haze (>5%) as part of its function, and also includes an ETC coating 34 with high durability (e.g., as having an average contact angle with water of 100 degrees or more after being subjected to 2000 reciprocating cycles, or 3500 reciprocating cycles, under a load of 1 kg according to the Steel Wool Test). As used herein, the "haze" attributes and measurements reported in the disclosure are as measured on, or otherwise based on measurements from, a BYK-Gardner haze meter using an aperture over the source port having a diameter of about 7 mm.

The ETC coating 34 can be applied or disposed in various ways on the film 14. According to some examples, the ETC coating 34 can be deposited by various methods, including but not limited to, spray coating, dip coating, spin coating, and vapor deposition. Vapor deposition approaches for depositing the ETC coating 34 can include, but are not limited to, physical vapor deposition ("PVD"), electron beam deposition ("e-beam" or "EB"), ion-assisted deposition-EB ("IAD-EB"), laser ablation, vacuum arc deposition, thermal evaporation, sputtering, plasma enhanced chemical vapor deposition (PECVD) and other similar vapor deposition techniques.

According to various examples, the optical film 14 may also include a crack mitigating layer. This crack mitigating layer may suppress or prevent crack bridging between the film 14 and the substrate 18, thus modifying or improving the mechanical properties or strength of the article 10. Embodiments of crack mitigating layers are further described in U.S. patent application Ser. Nos. 14/052,055, 14/053,093 and 14/053,139, which are incorporated herein by reference. The crack mitigating layer may include crack blunting materials, crack deflecting materials, crack arresting materials, tough materials, or controlled-adhesion interfaces. The crack mitigating layer may comprise polymeric materials, nanoporous materials, metal oxides, metal fluorides, metallic materials, or other materials mentioned herein for use in the film 14. The structure of the crack mitigating layer may be a multilayer structure, wherein the multilayer structure is designed to deflect, suppress, or prevent crack propagation. The crack mitigating layer may include nanocrystallites, nanocomposite materials, transformation toughened materials, multiple layers of organic materials, multiple layers of inorganic materials, multiple layers of interdigitating organic and inorganic materials, or hybrid organic-inorganic materials. The crack mitigating layer may have a strain-to-failure that is greater than about 2%, or greater than about 10%. These crack mitigating layers can also be combined separately with the substrate 18 or the film 14. As noted above, in some cases the interrupting layers 14B can also be designed through their mechanical properties to act as crack mitigating or crack deflecting layers.

The crack mitigating layer may include tough or nanostructured inorganics, for example, zinc oxide, certain Al alloys, Cu alloys, steels, or stabilized tetragonal zirconia (including transformation toughened, partially stabilized, yttria stabilized, ceria stabilized, calcia stabilized, and magnesia stabilized zirconia); zirconia-toughened ceramics (including zirconia-toughened alumina); ceramic-ceramic composites; carbon-ceramic composites; fiber- or whisker-reinforced ceramics or glass-ceramics (for example, SiC or $Si_3N_4$ fiber- or whisker-reinforced ceramics); metal-ceramic composites; porous or non-porous hybrid organic-inorganic materials, for example, nanocomposites, polymer-ceramic composites, polymer-glass composites, fiber-reinforced polymers, carbon-nanotube or graphene-ceramic composites, silsesquioxanes, polysilsesquioxanes, or "ORMOSILs" (organically modified silica or silicate), and/or a variety of porous or non-porous polymeric materials, for example siloxanes, polysiloxanes, polyacrylates, polyacrylics, PI (polyimides), fluorinated polyimide, polyamides, PAI (polyamideimides), polycarbonates, polysulfones, PSU or PPSU (polyarylsulfones), fluoropolymers, fluoroelastomers, lactams, polycylic olefins, and similar materials, including, but not limited to PDMS (polydimethylsiloxane), PMMA (poly(methyl methacrylate)), BCB (b enzocyclobutene), PEI (polyethyletherimide), poly(arylene ethers) such as PEEK (poly-ether-ether-ketone), PES (polyethersulfone) and PAR (polyarylate), PET (polyethylene terephthalate), PEN (polyethylene napthalate=poly(ethylene-2,6-napthalene dicarboxylate), FEP (fluorinated ethylene propylene), PTFE (polytetrafluoroethylene), PFA (perfluoroalkoxy polymer, e.g., trade names Teflon®, Neoflon®) and similar materials. Other suitable materials include modified polycarbonates, some versions of epoxies, cyanate esters, PPS (polyphenylsulfides), polyphenylenes, polypyrrolones, polyquinoxalines, and bismaleimides.

According to various examples, an exemplary method of forming the film 14, or functional coating, on the substrate 18 may include steps of depositing the first portion 14A on the primary surface 18A of the substrate 18. As explained above, the first portion 14A may be deposited in a variety of manners including chemical vapor deposition (e.g., plasma-enhanced chemical vapor deposition, low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation, sputtering and/or atomic layer deposition. Next, a step of depositing one or more interrupting layers 14B including a different microstructure than the first portion 14A over the first portion 14 and having an optical transmittance of greater than about 85% over the visible wavelength range from about 450 nm to about 650 nm is performed. As explained above, the interrupting layers may be amorphous, crystalline or any other microstructure which is different than that of the bulk layer 30 of the first portion 14A. Next, a step of depositing the second portion 14B over the one or more interrupting layers 14B is performed. Such a step may include the deposition of additional bulk layers 30. The method may further include the step of depositing the one or more interrupting layers 14B to have a thickness of about 100 nm or less. As explained above, the interrupting layers 14B may have a thickness of about 100 nm or less, 90 nm or less, 80 nm or less, 70 nm or less, 60 nm or less, 50 nm or less, 40 nm or less, 30 nm or less, 20 nm or less, 10 nm or less, 9 nm or less, 8 nm or less, 7 nm or less, 6 nm or less, 5 nm or less, 4 nm or less, 3 nm or less, 2 nm or less, or 1 nm or less. It will be understood that the steps of the method may be performed in any order and that steps may be removed and/or added without departing from the teachings provided herein.

Figure 2:
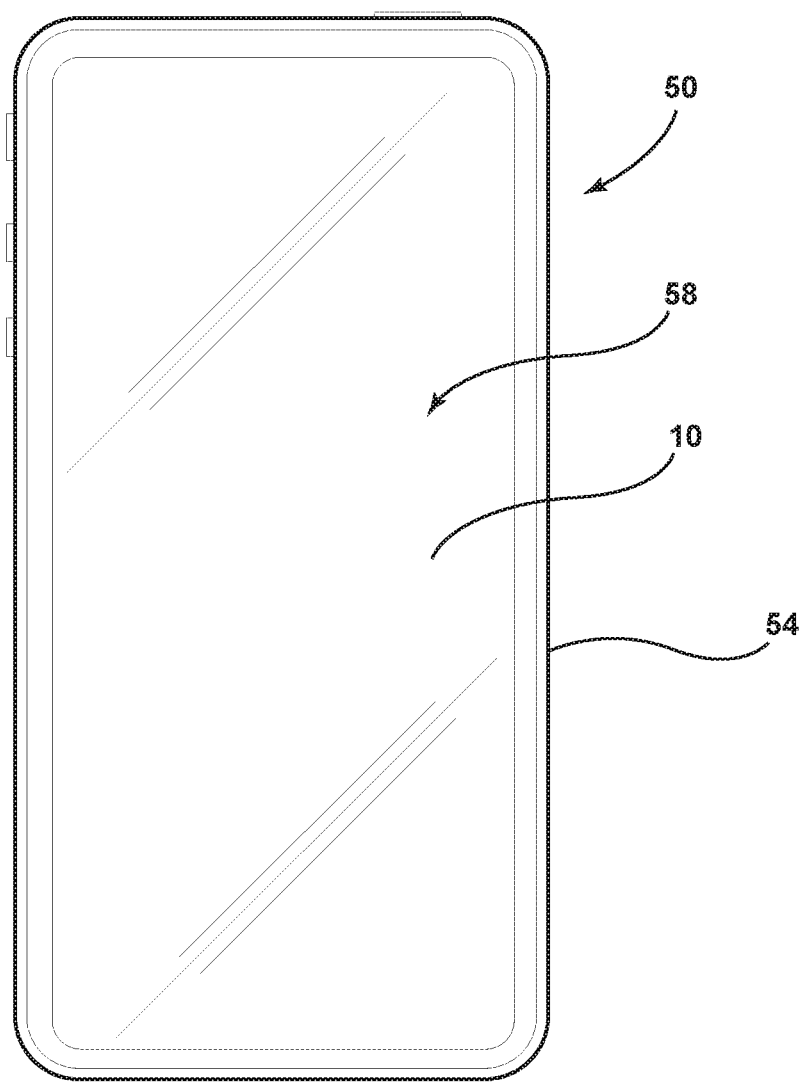
FIG. 2 is a consumer electronic product, according to at least one example.
Figure 3:
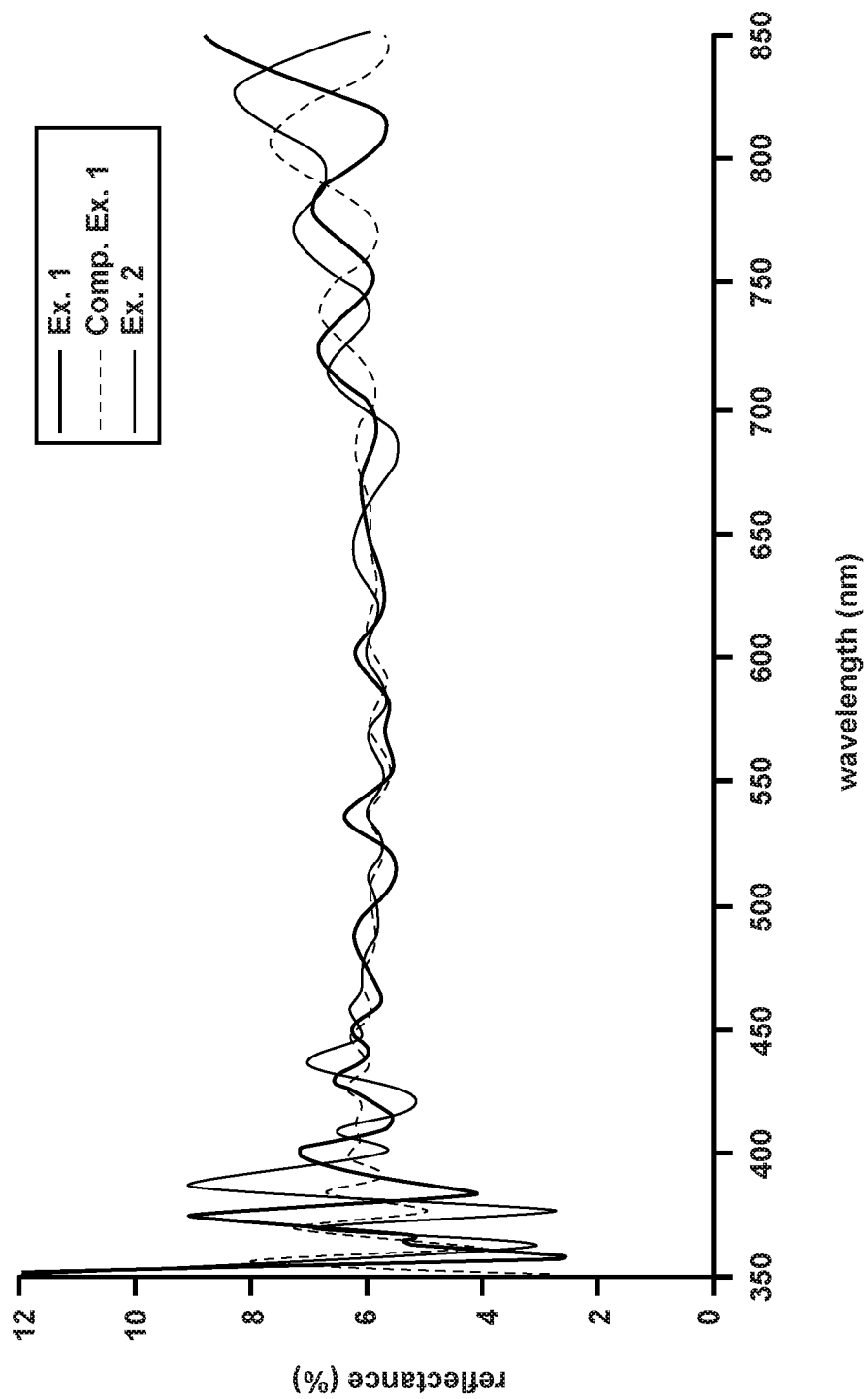
FIG. 3 is a plot of a 5° angle of incidence of modeled first surface reflectance for a variety of examples of the present disclosure and a comparative example.
Figure 4:
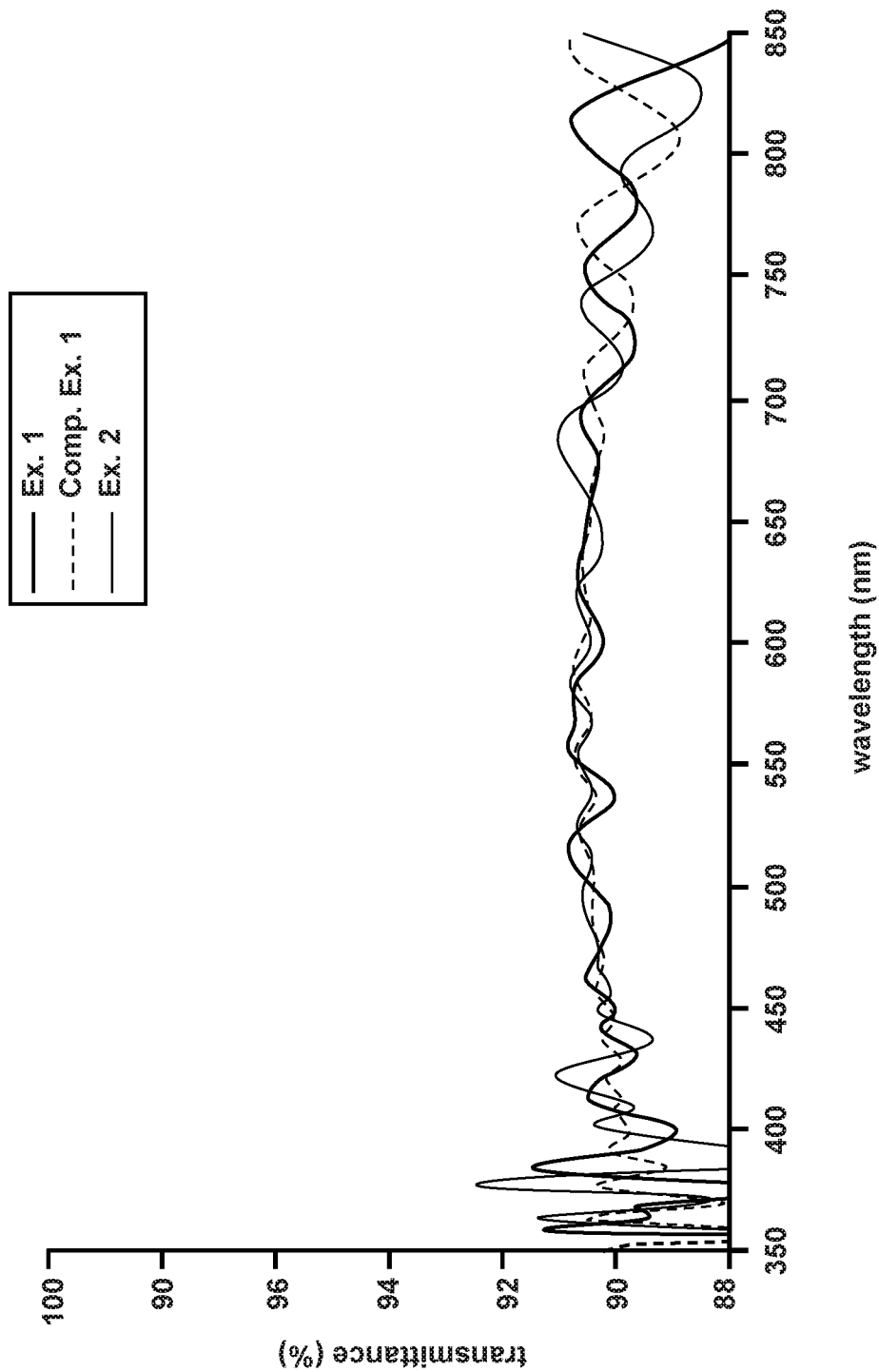
FIG. 4 is a plot of a 5° angle of incidence of modeled two-surface transmittance for a variety of examples of the present disclosure and a comparative example.
Figure 5A:
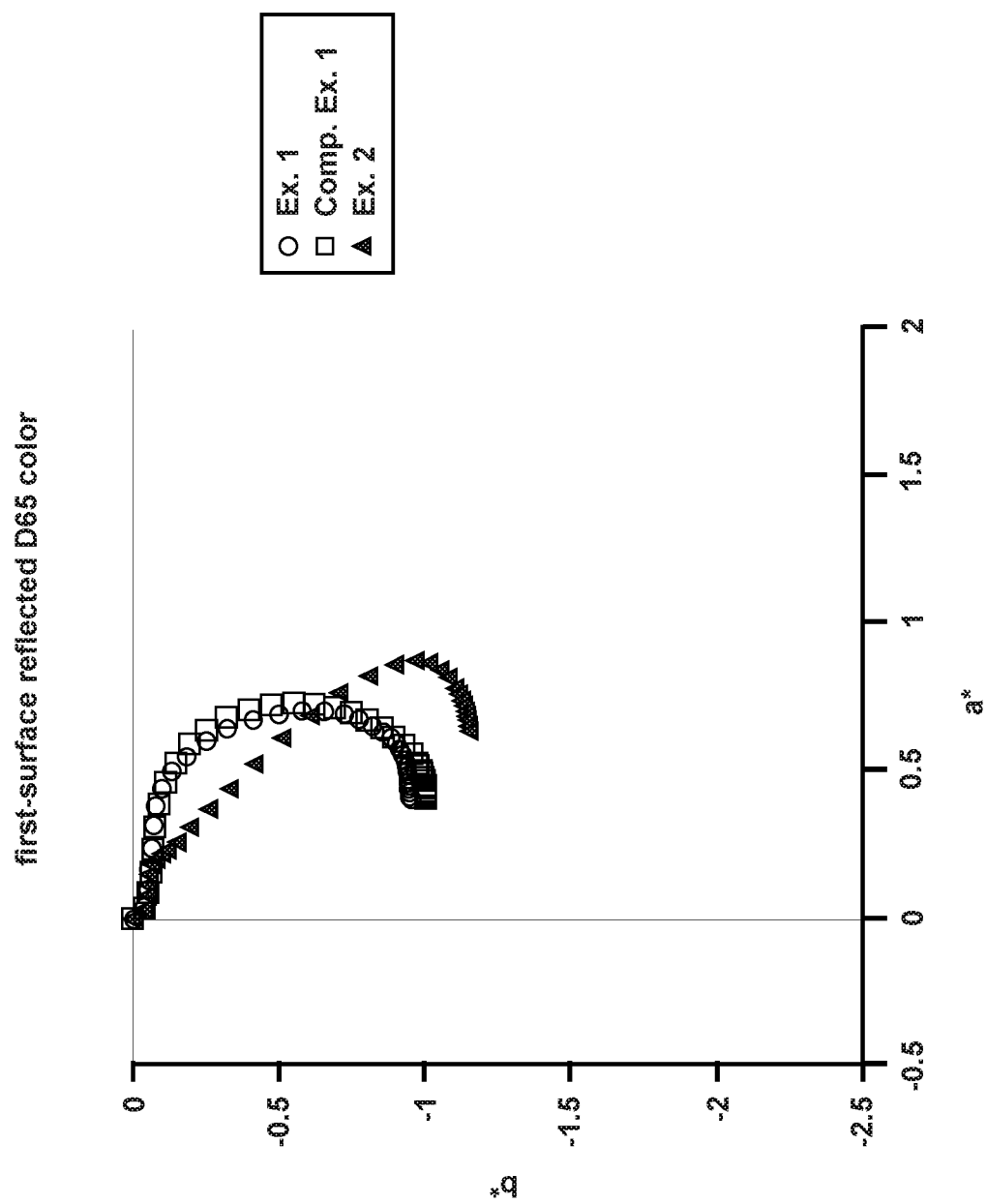
FIG. 5A is a plot of first-surface reflected D65 color for all viewing angles from 0° to 90° for a variety of examples of the present disclosure and a comparative example.
Figure 5B:
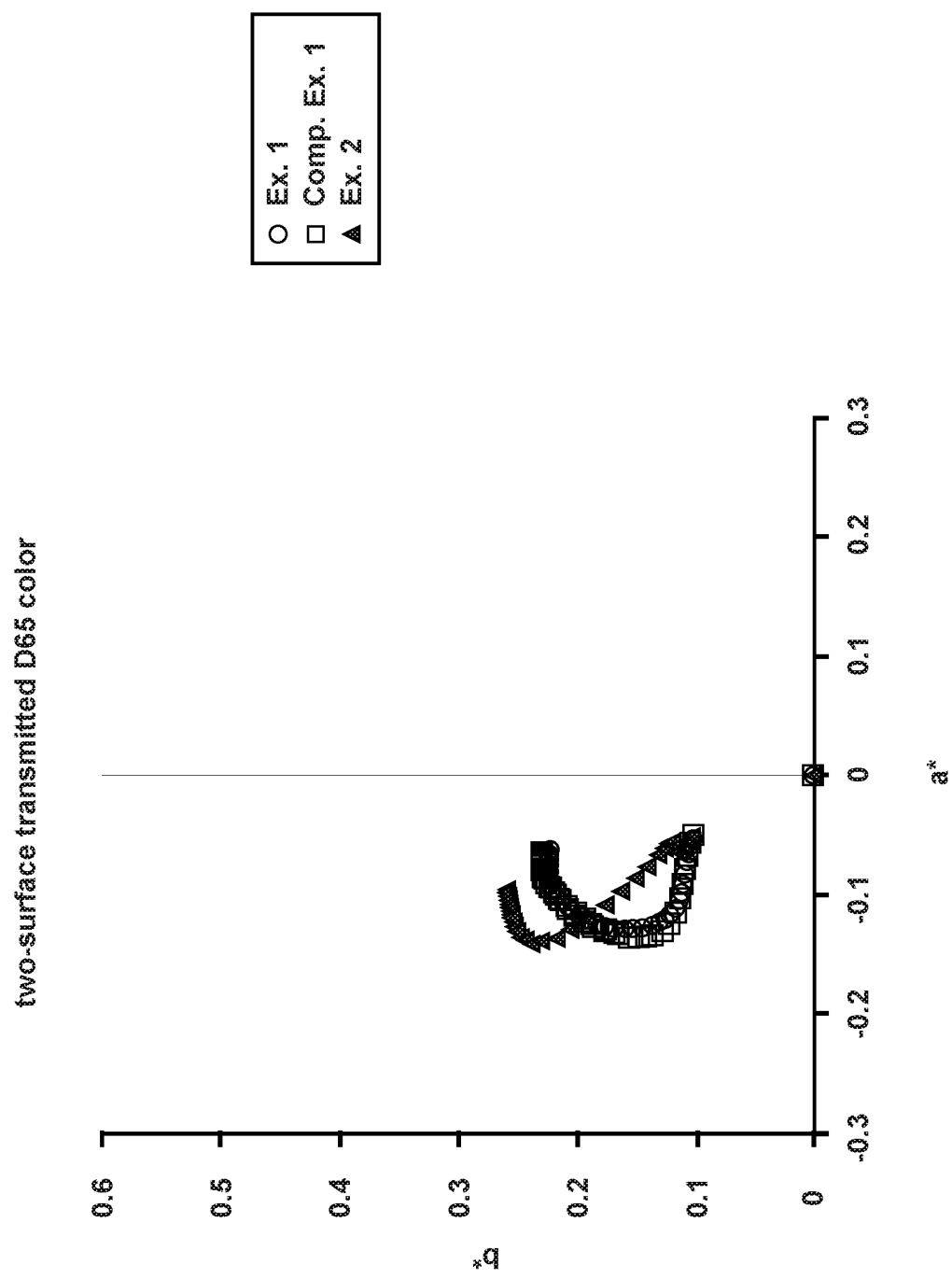
FIG. 5B is a plot of two-surface transmitted D65 color for all viewing angles from 0° to 90° for a variety of examples of the present disclosure and a comparative example.
Figure 6:
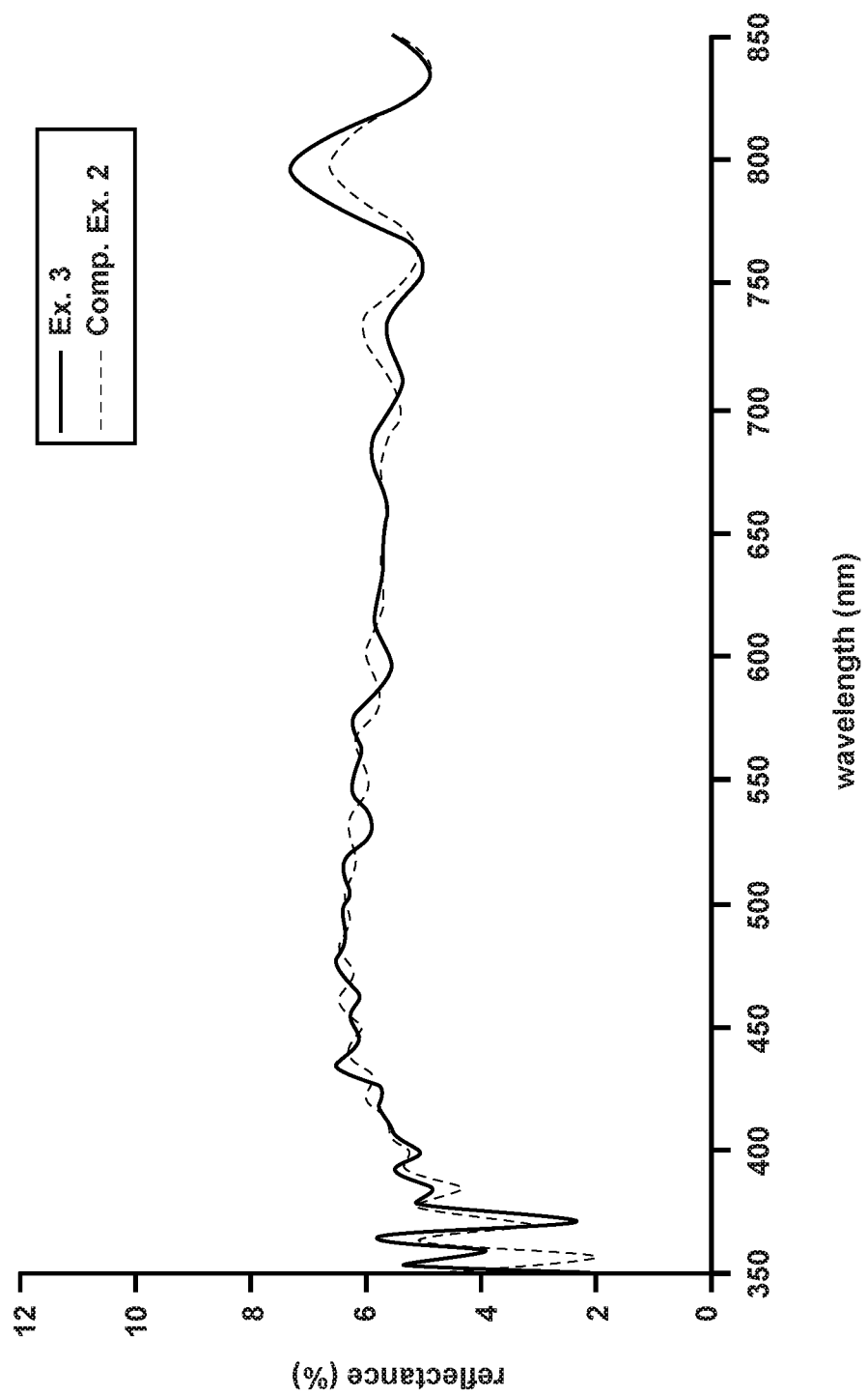
FIG. 6 is a plot of a 6° angle of incidence first-surface reflectance for at least one example of the present disclosure and a comparative example.
Figure 7:
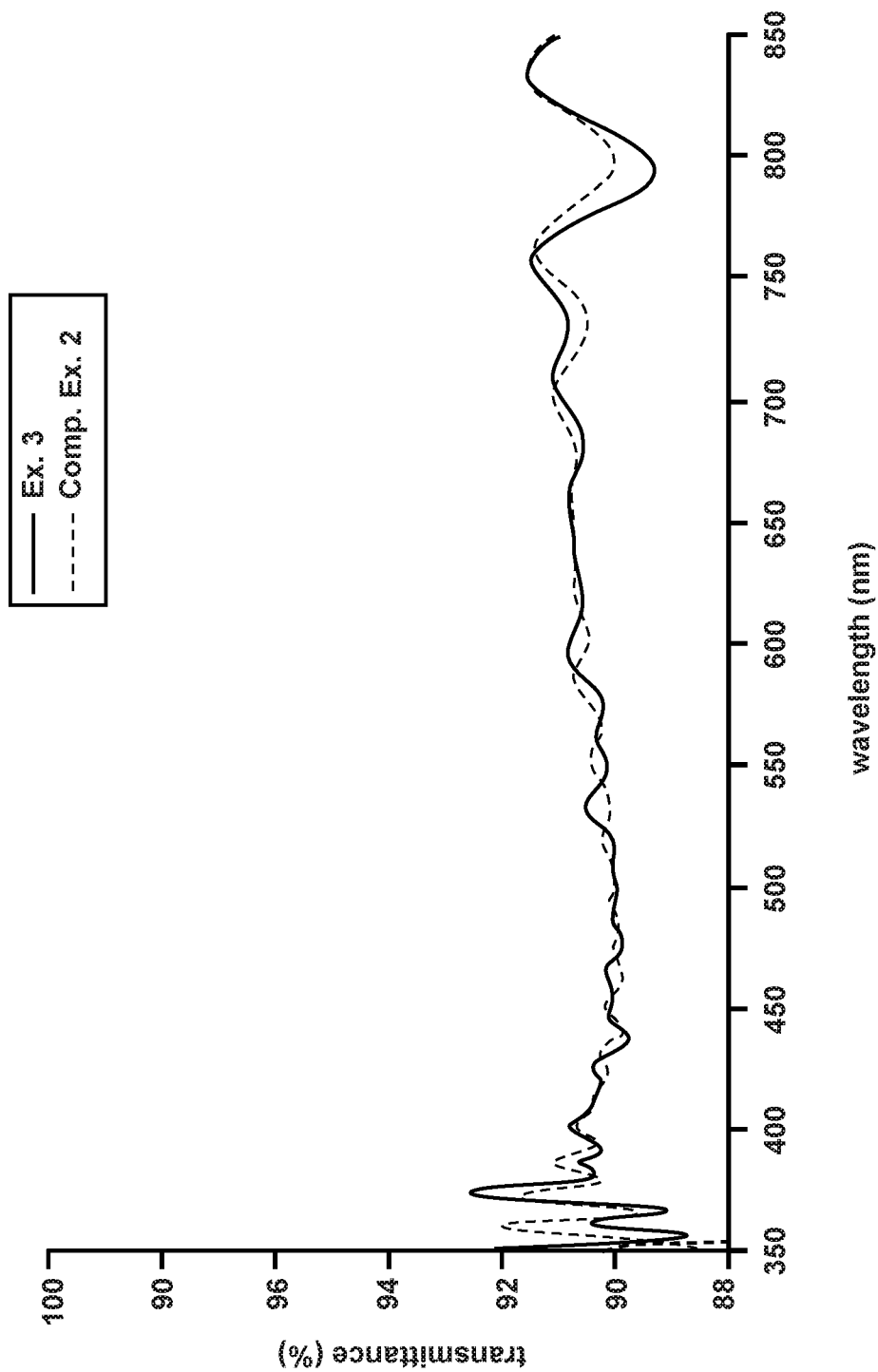
FIG. 7 is a plot of a 6° angle of incidence two-surface transmittance for at least one example of the present disclosure and a comparative example.
Figure 8:
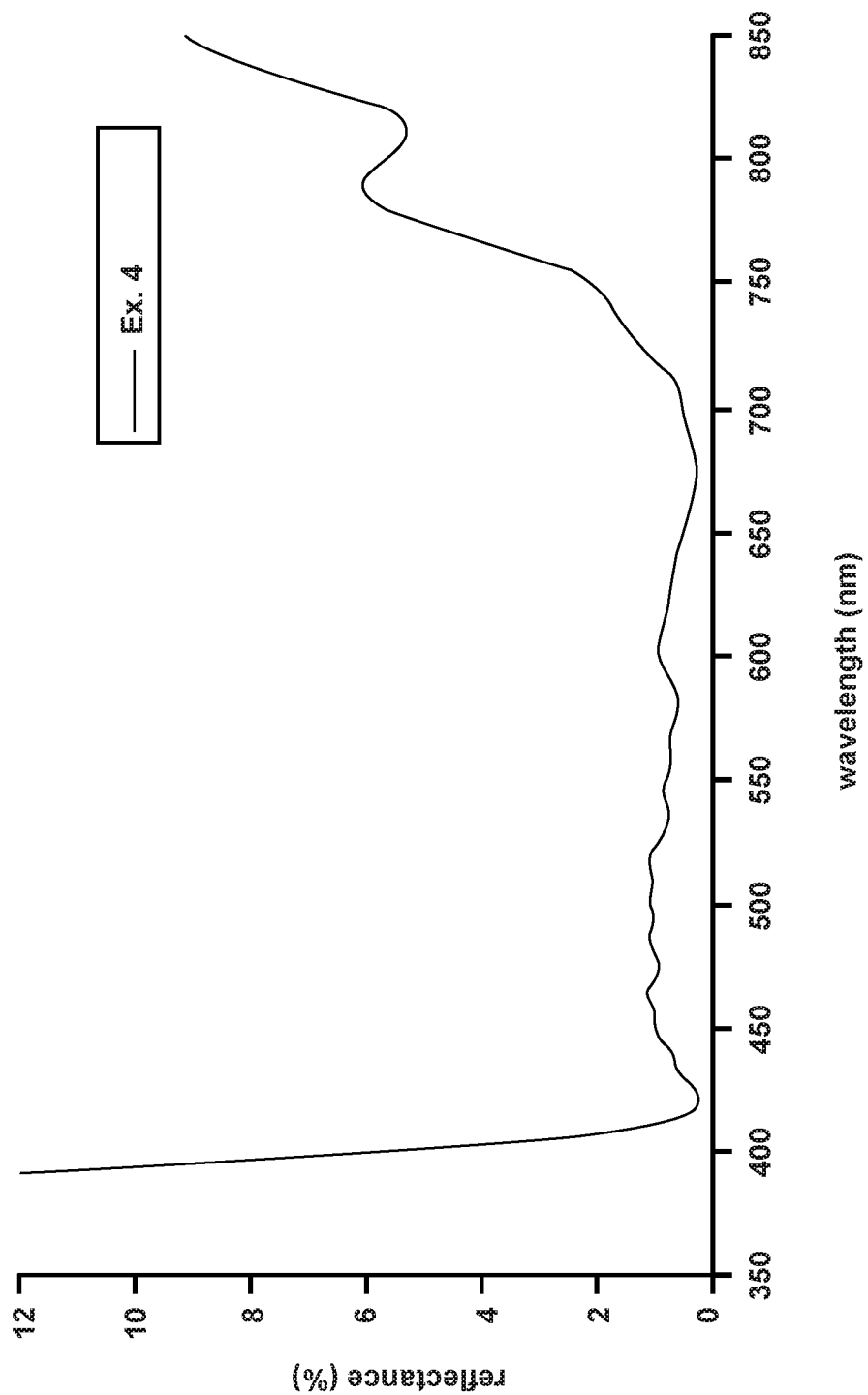
FIG. 8 is a plot of a 5° angle of incidence first-surface reflectance, according to at least one example of the present disclosure.
Figure 9:
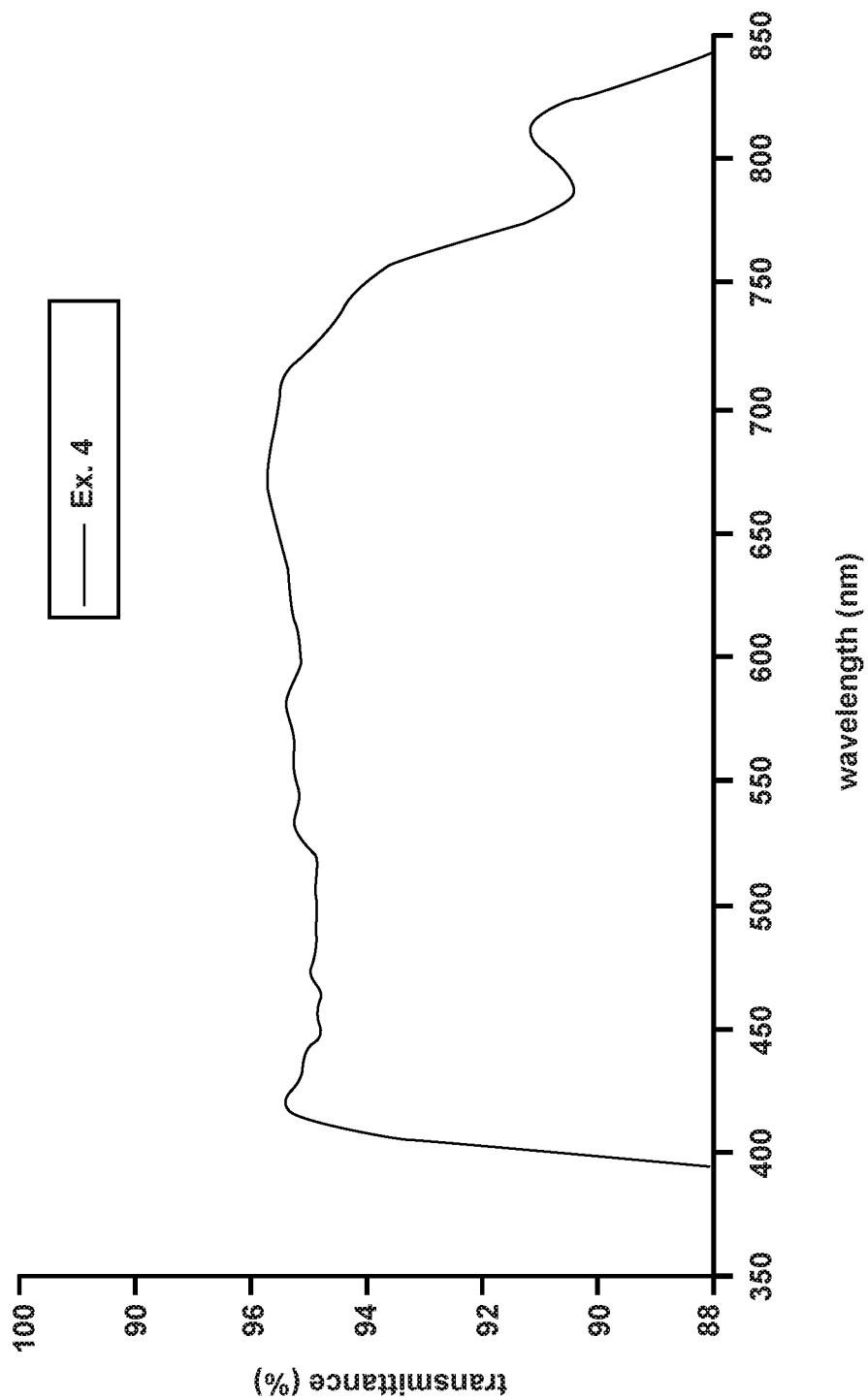
FIG. 9 is a plot of a 5° angle of incidence two-surface transmittance, according to at least one example of the present disclosure.
Figure 10A:
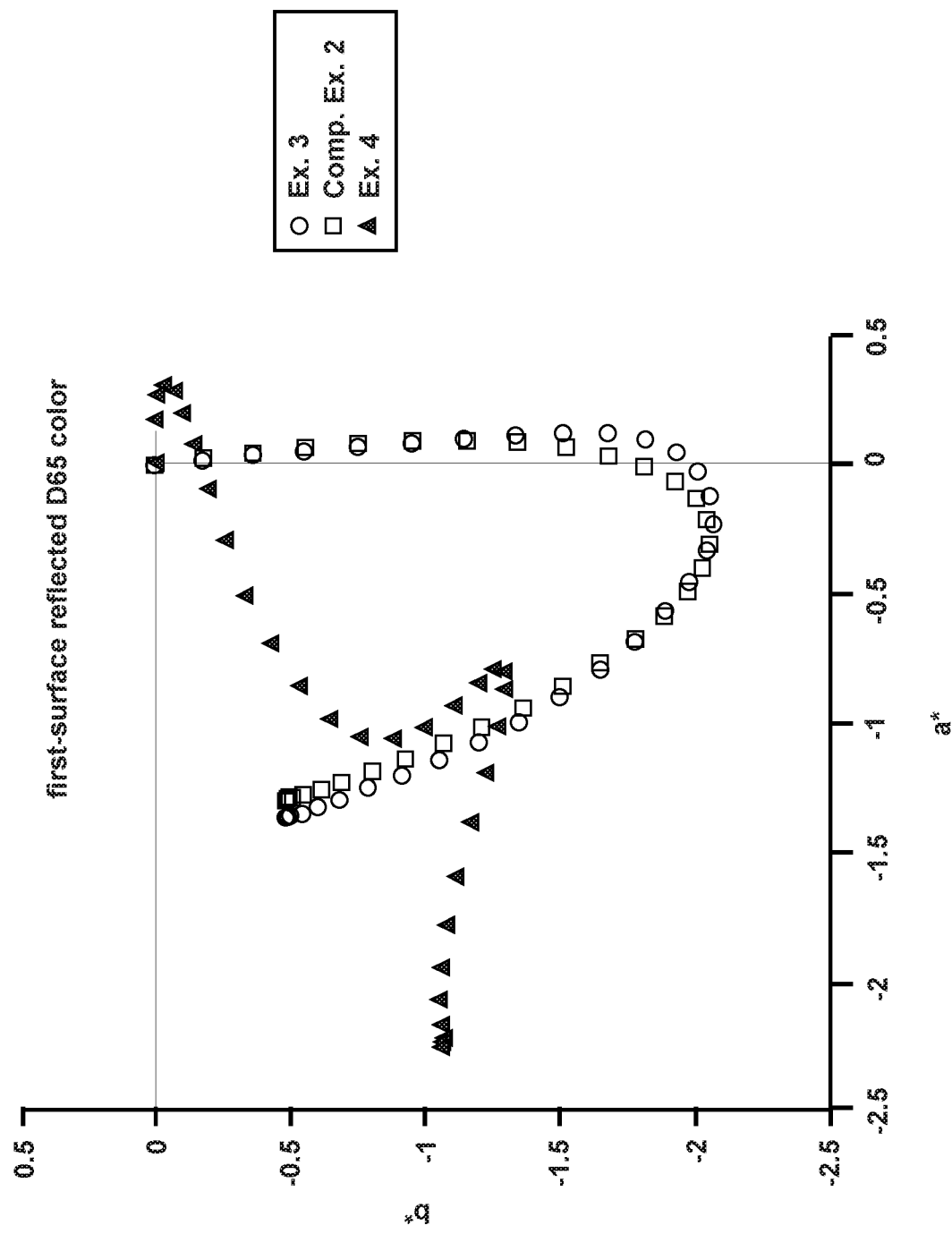
FIG. 10A is a plot of first-surface reflected D65 color for all viewing angles from 0° to 90° for a variety of examples of the present disclosure and a comparative example.
Figure 10B:
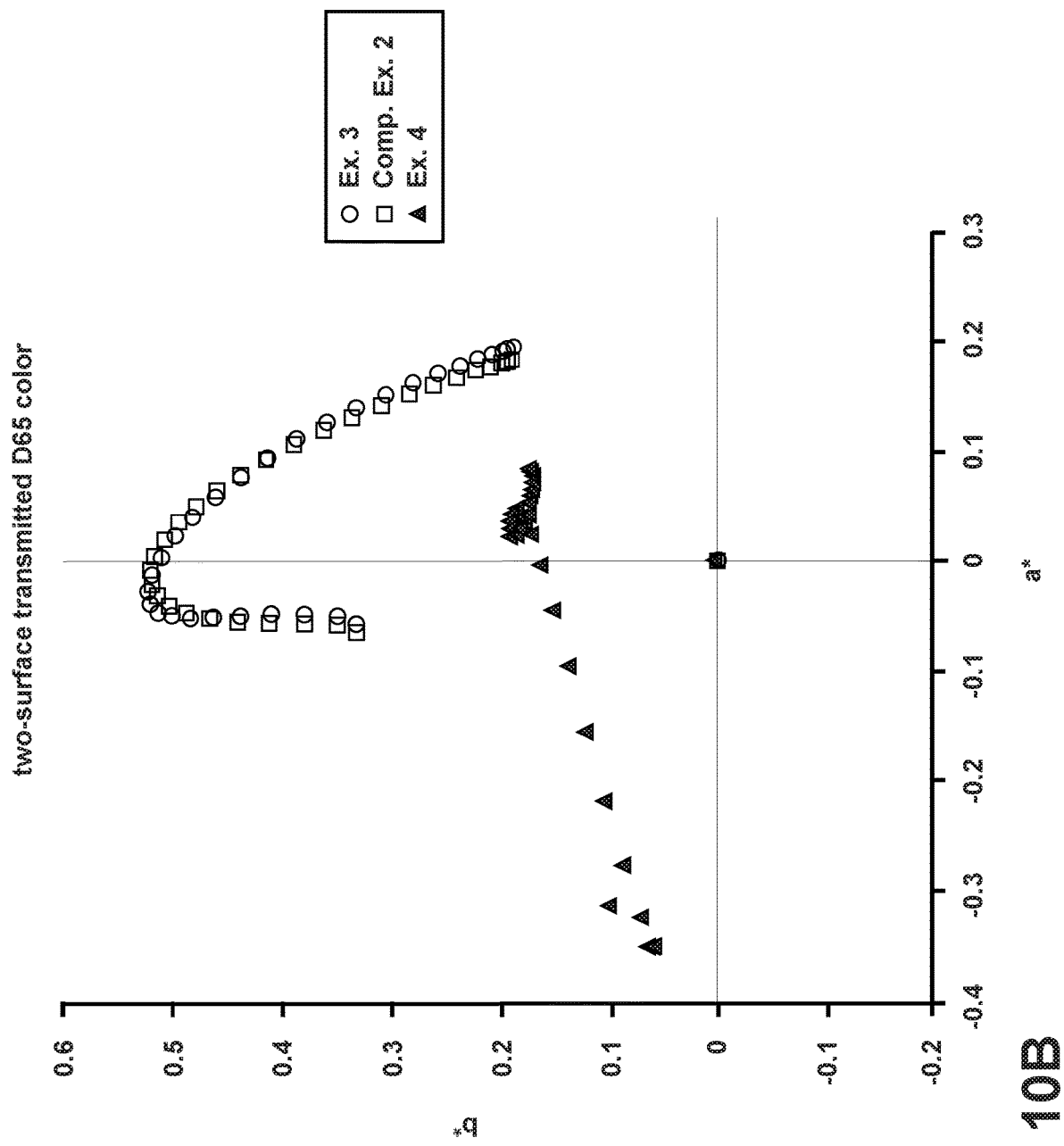
FIG. 10B is a is a plot of two-surface transmitted D65 color for all viewing angles from 0° to 90° for a variety of examples of the present disclosure and a comparative example.

Referring now to FIG. 2, the article 10 may be incorporated into an electronic product 50. Although depicted as a mobile telephone, the electronic product 50 may be a tablet, portable music device, television, computer monitor, or any kind of electronic product 50 which may graphically display information (e.g., video, pictures, etc.). The electronic product 50 includes a housing 54 having a front surface, a back surface and side surfaces. Electrical components are disposed at least partially within the housing 54. The electrical components may include at least a controller, a memory, and a display. The display may be located at or adjacent the front surface of the housing 54. A cover glass 58 is disposed over the display. According to various examples, a portion of the housing 54 or the cover glass 58 includes the article 10 as described herein.

Use of the present disclosure may offer a variety of advantages. First, use of the interrupting layers 14B allows for the polycrystalline or semi-crystalline bulk layers 30 to have a controlled crystallite size or a controlled surface roughness while maintaining high hardness, high optical transparency, and low color shift. As explained above, the low roughness provided by the controlled crystallite size of the bulk layers 30 may increase the mechanical durability of the ETC layer 34 by providing a smooth surface for application of the ETC coating 34. Second, the interrupting layers 14B can include the same or similar materials to that employed in the bulk layers 30 which may allow ease of processing and in-situ formation of the interrupting layers 14B in the same deposition chamber as the bulk layers 30. The benefits of low roughness can include low friction, enhanced wear properties, lower heat generating due to friction, enhanced sliding, high cleanability, enhanced bonding, and the like.

The following examples represent certain non-limiting examples of the disclosure.

EXAMPLES

Referring now to FIGS. 3-10B, various optical coatings (e.g., the film 14) with modifying layers (e.g., the interrupting layers 14B) have been modeled and formed to have similar or identical nanoindentation hardness when compared to a similar hardcoatings having no modifying layers. Without being bound by theory, it is believed that similar or identical nanoindentation hardness indicates that hardcoatings with modifying layers such as described here can be made to have similar scratch resistance, damage resistance, toughness, and fracture behavior as hardcoatings without the modifying layers.

$AlO_xN_y$, $Al_2O_3$, and $SiO_2$ films were fabricated by reactive sputtering and the resulting refractive indices measured using spectroscopic ellipsometry. These refractive index dispersion profiles were used in optical transfer matrix modeling to design the transparent modifying layers and overall hardcoating and scratch-resistant anti-reflective coating structures modeled in the examples provided below. Optical modeling was also used to design the target coating thicknesses of Examples 5 and 6. The modifying layers modeled here are designed to be thin (e.g., about 100 nm or less for each layer, in some cases about 50 nm or less, or about 25 nm or less), amorphous or of a different crystal structure than the majority hardcoating material (e.g., the bulk layers 30), and optically transparent either through layer thickness design or through closely matching the refractive index of the hardcoating material.

The plots of FIGS. 3-10B depict of a variety of modeled optical properties for different examples of the coating. As will be seen, the optical properties (e.g., reflectance and transmittance) of Comparative Example 1 and Comparative Example 2, which do not include the modifying layers, do not substantially differ from Examples 1, 2, 3 and 4 which contain modifying layers. Each of the modifying layers of Examples 1, 2, 3 and 4 are composed of $Al_2O_3$. As such, the modifying layers do not substantially alter the optical properties of the examples of the optical coating. Tables 1, 2 and 3 provide an abbreviated listing of refractive indices for materials used in the optical modeling of Comparative Examples 1 and 2 and Examples 1-4.

TABLE 1

Listing of refractive indices for $AlO_xN_y$-thick, $AlO_xN_y$-thin and AlON-57

| Material Wavelength (nm) | $AlO_xN_y$-thick Refractive Index (n) | Extinction Coefficient (k) | Material Wavelength (nm) | $AlO_xN_y$-thin Refractive Index (n) | Extinction Coefficient (k) | Material Wavelength (nm) | AlON-57 Refractive Index (n) | Extinction Coefficient (k) |
|---|---|---|---|---|---|---|---|---|
| 400.0 | 2.0140 | 0.0001 | 400.0 | 2.0337 | 0.0000 | 400 | 2.0554 | 3.00E−05 |
| 450.0 | 1.9921 | 0.0000 | 450.0 | 2.0117 | 0.0000 | 450 | 2.0322 | 0 |
| 500.0 | 1.9772 | 0.0000 | 500.0 | 1.9969 | 0.0000 | 500 | 2.0169 | 0 |
| 550.0 | 1.9666 | 0.0000 | 550.0 | 1.9863 | 0.0000 | 550 | 2.0061 | 0 |
| 600.0 | 1.9587 | 0.0000 | 600.0 | 1.9784 | 0.0000 | 600 | 1.9981 | 0 |
| 650.0 | 1.9527 | 0.0000 | 650.0 | 1.9723 | 0.0000 | 650 | 1.9921 | 0 |
| 700.0 | 1.9480 | 0.0000 | 700.0 | 1.9675 | 0.0000 | 700 | 1.9875 | 0 |
| 750.0 | 1.9443 | 0.0000 | 750.0 | 1.9636 | 0.0000 | 750 | 1.9838 | 0 |
| 800.0 | 1.9413 | 0.0000 | 800.0 | 1.9604 | 0.0000 | 800 | 1.9808 | 0 |

TABLE 2

Listing of refractive indices for $Al_2O_3$ and $Al_2O_3$-RS.

| Material Wavelength (nm) | $Al_2O_3$ Refractive Index (n) | Extinction Coefficient (k) | Material Wavelength (nm) | $Al_2O_3$-RS Refractive Index (n) | Extinction Coefficient (k) |
|---|---|---|---|---|---|
| 400 | 1.678 | 0 | 401.3 | 1.6868 | 0 |
| 450 | 1.6713 | 0 | 450.7 | 1.6775 | 0 |
| 500 | 1.6665 | 0 | 500.2 | 1.6709 | 0 |
| 550 | 1.6629 | 0 | 549.5 | 1.6661 | 0 |
| 600 | 1.6601 | 0 | 600.5 | 1.6623 | 0 |
| 650 | 1.6579 | 0 | 649.7 | 1.6596 | 0 |
| 700 | 1.6561 | 0 | 700.5 | 1.6573 | 0 |
| 750 | 1.6546 | 0 | 749.7 | 1.6555 | 0 |
| 800 | 1.6532 | 0 | 800.4 | 1.6540 | 0 |

TABLE 3

Listing of refractive indices for $SiO_2$ and $SiO_2$-56.

| Material Wavelength (nm) | $SiO_2$ Refractive Index (n) | Extinction Coefficient (k) | Material Wavelength (nm) | $SiO_2$-56 Refractive Index (n) | Extinction Coefficient (k) |
|---|---|---|---|---|---|
| 401.1 | 1.4948 | 0 | 400 | 1.4949 | 1.00E−05 |
| 450.3 | 1.4891 | 0 | 450 | 1.4890 | 0 |
| 499.5 | 1.4849 | 0 | 500 | 1.4846 | 0 |
| 550.1 | 1.4816 | 0 | 550 | 1.4811 | 0 |
| 600.8 | 1.4791 | 0 | 600 | 1.4785 | 0 |
| 649.7 | 1.4771 | 0 | 650 | 1.4764 | 0 |
| 700.2 | 1.4755 | 0 | 700 | 1.4747 | 0 |
| 750.6 | 1.4742 | 0 | 750 | 1.4733 | 0 |
| 799.3 | 1.4731 | 0 | 800 | 1.4721 | 0 |

TABLE 4

Detailed design of Comparative Example 1.

| Layer | Material | Refractive Index Refractive Index @ 550 nm | Physical Thickness Thickness (nm) |
|---|---|---|---|
| Medium | Air | 1 | |
| 10 | $SiO_2$-56 | 1.481 | 45 |
| 9 | AlON-57 | 2.006 | 39 |
| 8 | $SiO_2$-56 | 1.481 | 11 |

TABLE 4-continued

Detailed design of Comparative Example 1.

| Layer | Material | Refractive Index Refractive Index @ 550 nm | Physical Thickness Thickness (nm) |
|---|---|---|---|
| 7 | AlON-57 | 2.006 | 2000 |
| 6 | $SiO_2$-56 | 1.481 | 8.9 |
| 5 | AlON-57 | 2.006 | 42.6 |
| 4 | $SiO_2$-56 | 1.481 | 30.1 |
| 3 | AlON-57 | 2.006 | 24.5 |
| 2 | $SiO_2$-56 | 1.481 | 52.4 |
| 1 | AlON-57 | 2.006 | 7.7 |
| Substrate | 5318 Glass | 1.5054 | |
| Total Thickness | | | 2261.2 |

TABLE 5

Detailed design of Example 1.

| Layer | Material | Refractive Index @ 550 nm | Physical Thickness (nm) |
|---|---|---|---|
| Medium | Air | 1 | |
| 16 | $SiO_2$-56 | 1.481 | 45 |
| 15 | AlON-57 | 2.006 | 39 |
| 14 | $SiO_2$-56 | 1.481 | 11 |
| 13 | AlON-57 | 2.006 | 1100 |
| 12 | $Al_2O_3$-RS | 1.666 | 6 |
| 11 | AlON-57 | 2.006 | 60.1 |
| 10 | $Al_2O_3$-RS | 1.666 | 9.7 |
| 9 | AlON-57 | 2.006 | 59.1 |
| 8 | $Al_2O_3$-RS | 1.666 | 6 |
| 7 | AlON-57 | 2.006 | 891 |
| 6 | $SiO_2$-56 | 1.481 | 8.9 |
| 5 | AlON-57 | 2.006 | 42.6 |
| 4 | $SiO_2$-56 | 1.481 | 30.1 |
| 3 | AlON-57 | 2.006 | 24.5 |

TABLE 5-continued

Detailed design of Example 1.

| Layer | Material | Refractive Index @ 550 nm | Physical Thickness (nm) |
|---|---|---|---|
| 2 | SiO$_2$-56 | 1.481 | 52.4 |
| 1 | AlON-57 | 2.006 | 7.7 |
| Substrate | 5318 Glass | 1.5054 | |
| Total Thickness | | | 2393.1 |

TABLE 6

Detailed design of Example 2.

| Layer | Material | Refractive Index @ 550 nm | Physical Thickness (nm) |
|---|---|---|---|
| Medium | Air | 1 | |
| 22 | SiO$_2$-56 | 1.481 | 45 |
| 21 | AlON-57 | 2.006 | 39 |
| 20 | SiO$_2$-56 | 1.481 | 11 |
| 19 | AlON-57 | 2.006 | 600 |
| 18 | Al$_2$O$_3$-RS | 1.666 | 5 |
| 17 | AlON-57 | 2.006 | 60.1 |
| 16 | Al$_2$O$_3$-RS | 1.666 | 9.7 |
| 15 | AlON-57 | 2.006 | 59.1 |
| 14 | Al$_2$O$_3$-RS | 1.666 | 5 |
| 13 | AlON-57 | 2.006 | 705 |
| 12 | Al$_2$O$_3$-RS | 1.666 | 5 |
| 11 | AlON-57 | 2.006 | 60.1 |
| 10 | Al$_2$O$_3$-RS | 1.666 | 9.7 |
| 9 | AlON-57 | 2.006 | 59.1 |
| 8 | Al$_2$O$_3$-RS | 1.666 | 5 |
| 7 | AlON-57 | 2.006 | 697 |
| 6 | SiO$_2$-56 | 1.481 | 8.9 |
| 5 | AlON-57 | 2.006 | 42.6 |
| 4 | SiO$_2$-56 | 1.481 | 30.1 |
| 3 | AlON-57 | 2.006 | 24.5 |
| 2 | SiO$_2$-56 | 1.481 | 52.4 |
| 1 | AlON-57 | 2.006 | 7.7 |
| Substrate | 5318 Glass | 1.5054 | |
| Total Thickness | | | 2541 |

TABLE 7

Detailed design of Comparative Example 2.

| Layer | Material | Refractive Index @ 550 nm | Physical Thickness (nm) |
|---|---|---|---|
| Medium | Air | 1 | |
| 10 | SiO2 | 1.4816 | 53.1 |
| 9 | AlO$_x$N$_y$-thin | 1.9863 | 44.5 |
| 8 | SiO$_2$ | 1.4816 | 15.7 |
| 7 | AlO$_x$N$_y$-thick | 1.9666 | 2000.0 |
| 6 | SiO$_2$ | 1.4816 | 9.3 |
| 5 | AlO$_x$N$_y$-thin | 1.9863 | 41.3 |
| 4 | SiO$_2$ | 1.4816 | 30.5 |
| 3 | AlO$_x$N$_y$-thin | 1.9863 | 24.8 |
| 2 | SiO$_2$ | 1.4816 | 52.2 |
| 1 | AlO$_x$N$_y$-thin | 1.9863 | 8.1 |
| Substrate | 5318 Glass | 1.5054 | |
| Total Thickness | | | 2279.5 |

TABLE 8

Detailed design of Example 3.

| Layer | Material | Refractive Index @ 550 nm | Physical Thickness (nm) |
|---|---|---|---|
| Medium | Air | 1 | |
| 18 | SiO$_2$ | 1.4816 | 53.1 |
| 17 | AlO$_x$N$_y$-thin | 1.9863 | 44.5 |
| 16 | SiO$_2$ | 1.4816 | 15.7 |
| 15 | AlO$_x$N$_y$-thick | 1.9666 | 1000.0 |
| 14 | Al$_2$O$_3$ | 1.6629 | 10.0 |
| 13 | AlO$_x$N$_y$-thin | 1.9863 | 45.4 |
| 12 | Al$_2$O$_3$ | 1.6629 | 24.2 |
| 11 | AlO$_x$N$_y$-thin | 1.9863 | 42.4 |
| 10 | Al$_2$O$_3$ | 1.6629 | 24.2 |
| 9 | AlOxNy-thin | 1.9863 | 45.4 |
| 8 | Al$_2$O$_3$ | 1.6629 | 10.0 |
| 7 | AlO$_x$N$_y$-thick | 1.9666 | 1000.0 |
| 6 | SiO$_2$ | 1.4816 | 9.3 |
| 5 | AlO$_x$N$_y$-thin | 1.9863 | 41.3 |
| 4 | SiO$_2$ | 1.4816 | 30.5 |
| 3 | AlO$_x$N$_y$-thin | 1.9863 | 24.8 |
| 2 | SiO2 | 1.4816 | 52.2 |
| 1 | AlO$_x$N$_y$-thin | 1.9863 | 8.1 |
| Substrate | 5318 Glass | 1.5054 | |
| Total Thickness | | | 2481.04 |

TABLE 9

Detailed design of Example 4.

| Layer | Material | Refractive Index @ 550 nm | Physical Thickness (nm) |
|---|---|---|---|
| Medium | Air | 1 | |
| 24 | SiO$_2$ | 1.4816 | 86.6 |
| 23 | AlO$_x$N$_y$-thin | 1.9863 | 163.1 |
| 22 | SiO$_2$ | 1.4816 | 12.3 |
| 21 | AlO$_x$N$_y$-thin | 1.9863 | 97.2 |
| 20 | SiO$_2$ | 1.4816 | 22.5 |
| 19 | AlO$_x$N$_y$-thin | 1.9863 | 44.8 |
| 18 | SiO$_2$ | 1.4816 | 49.3 |
| 17 | AlO$_x$N$_y$-thin | 1.9863 | 39.3 |
| 16 | SiO$_2$ | 1.4816 | 22.7 |
| 15 | AlO$_x$N$_y$-thick | 1.9666 | 1000.0 |
| 14 | Al$_2$O$_3$ | 1.6629 | 10.0 |
| 13 | AlO$_x$N$_y$-thin | 1.9863 | 45.4 |
| 12 | Al$_2$O$_3$ | 1.6629 | 24.2 |
| 11 | AlO$_x$N$_y$-thin | 1.9863 | 42.4 |
| 10 | Al$_2$O$_3$ | 1.6629 | 24.2 |
| 9 | AlO$_x$N$_y$-thin | 1.9863 | 45.4 |
| 8 | Al$_2$O$_3$ | 1.6629 | 10.0 |
| 7 | AlO$_x$N$_y$-thick | 1.9666 | 1000.0 |
| 6 | SiO$_2$ | 1.4816 | 9.3 |
| 5 | AlO$_x$N$_y$-thin | 1.9863 | 41.3 |
| 4 | SiO$_2$ | 1.4816 | 30.5 |
| 3 | AlO$_x$N$_y$-thin | 1.9863 | 24.8 |
| 2 | SiO$_2$ | 1.4816 | 52.2 |
| 1 | AlO$_x$N$_y$-thin | 1.9863 | 8.1 |
| Substrate | 5318 Glass | 1.5054 | |
| Total Thickness | | | 2905.5 |

As can be seen from FIGS. 3-10B, introduction of the modifying layers (e.g., interrupting layers 14B composed of Al$_2$O$_3$) into the layered structure of the optical coatings (e.g., the film 14) does not substantially alter the reflectance, transmittance and/or reflected or transmitted color of the optical coatings as compared to optical coatings not incorporating the modifying layers.

In addition to optical modeling of exemplary coatings, multiple coating examples were experimentally fabricated to demonstrate the effectiveness of using the modifying layers.

The experimental examples were fabricated in a Denton sputtering tool in DC mode using an Al target with N, Ar, and Ar+5% $O_2$ process gases. $Al_2O_3$ was deposited at a pressure of 14 mTorr, 421 V, and 0.47 kW. The process gas was 95% Ar/5% $O_2$ fed in to the chamber at 50 sccm. $AlO_xN_y$ was deposited at a pressure of 2 mTorr, 295 V, and 0.40 kW, with process gases Ar set to 15 sccm and N2 set to 15 sccm. 2-3% residual oxygen is incorporated into the films (as analyzed by XPS) due to residual oxygen and water in the chamber. Comparative Example 3 is an optical coating not including the modifying layers, while Examples 5 and 6 include multiple modifying layers (e.g., the layers composed of $Al_2O_3$).

TABLE 10

Detailed design of fabricated Comparative Example 3.

| Layer | Material | Thickness (nm) |
|---|---|---|
| 1 | $AlO_XN_Y$ | 1000 |
| Substrate | Glass | |

TABLE 11

Detailed design of experimentally fabricated Example 5.

| Layer | Material | Thickness (nm) |
|---|---|---|
| 7 | $AlO_XN_Y$ | 430 |
| 6 | $Al_2O_3$ | 5 |
| 5 | $AlO_XN_Y$ | 59.5 |
| 4 | $Al_2O_3$ | 5 |
| 3 | $AlO_XN_Y$ | 59.5 |
| 2 | $Al_2O_3$ | 5 |
| 1 | $AlO_XN_Y$ | 430 |
| Substrate | Glass | |

TABLE 12

Detailed design of experimentally fabricated Example 6.

| Layer | Material | Thickness (nm) |
|---|---|---|
| 9 | $AlO_XN_Y$ | 400 |
| 8 | $Al_2O_3$ | 10 |
| 7 | $AlO_XN_Y$ | 45.4 |
| 6 | $Al_2O_3$ | 24.2 |
| 5 | $AlO_XN_Y$ | 42.4 |
| 4 | $Al_2O_3$ | 24.2 |
| 3 | $AlO_XN_Y$ | 45.4 |
| 2 | $Al_2O_3$ | 10 |
| 1 | $AlO_XN_Y$ | 400 |
| Substrate | Glass | |

Comparative Example 3, incorporating no modifying layers, had an average Rq of 5.1 nm, an average Ra of 4.1 nm, an elastic modulus of 199 GPa and a hardness of 14.6 GPa. Comparative Example 3 is a hardcoating that is primarily composed of polycrystalline $AlO_xN_y$ (in this case, AlN), doped with about 3 atomic % oxygen). Example 5, incorporating 3 modifying layers, had an average Rq of 3.6 nm, an average Ra of 2.9 nm, an elastic modulus of 190 GPa and a hardness of 14.5 GPa. Example 6, incorporating 4 modifying layers, had an average Rq of 3.5 nm, an average Ra of 2.8 nm, an elastic modulus of 215 GPa and a hardness of 16 GPa. These examples experimentally prove the concept of roughness reduction, microstructure control, and maintained hardness through insertion of very thin, optically designed amorphous (and in this case semi-porous) modifying layers (e.g., the interrupting layers 14B).

What is claimed is:

1. An article, comprising:
   a glass, glass-ceramic or ceramic substrate comprising a primary surface; and
   a functional coating disposed over the primary surface of the substrate, the coating comprising:
      a first portion disposed over the primary surface;
      one or more interrupting layers disposed over the first portion; and
      a second portion disposed over the one or more interrupting layers,
      wherein the one or more interrupting layers comprise a microstructure different than one of the first and second portions and the coating has an average optical transmittance greater than about 10% over the visible wavelength range from about 450 nm to about 650 nm; and
      wherein the second portion of the coating within about 100 nm from the interrupting layers comprises an average microstructural crystal size that is smaller than an average microstructural crystal size of the first portion within about 100 nm from the interrupting layers.

2. The article of claim 1, wherein the one or more interrupting layers comprise a microstructure which is different than both the first and second portions.

3. The article of claim 1, wherein the one or more interrupting layers has an amorphous microstructure.

4. The article of claim 1, wherein the first and second portions of the coating each comprise a plurality of layers and the coating has an average optical transmittance greater than about 50%.

5. The article of claim 1, wherein each of the one or more interrupting layers comprises a thickness of about 50 nm or less.

6. The article of claim 5, wherein the one or more interrupting layers comprise a thickness of about 10 nm or less.

7. The article of claim 1, wherein the one or more interrupting layers is porous.

8. The article of claim 1, wherein at least one of the first and second portions comprises a thickness from about 0.1 µm to about 2 µm.

9. The article of claim 1, wherein the one or more interrupting layers comprise three layers, and the article further comprises a plurality of spacing layers positioned between the one or more interrupting layers.

10. The article of claim 1, wherein the coating comprises a surface roughness of about 5 nm Rq or less.

11. The article of claim 1, wherein the first and second portions comprise respective first and second bulk layers, the first and second bulk layers each comprising a thickness of about 200 nm or greater and are each in contact with at least one of the plurality of interrupting layers.

12. The article of claim 1, wherein the plurality of interrupting layers comprises $Al_2O_3$.

13. The article of claim 1, wherein the substrate comprises a compressive stress region, the compressive stress region extending from the primary surface to a first selected depth in the substrate.

14. The article of claim 1, wherein the plurality of interrupting layers comprises a thickness that is about 10% or less of a total thickness of the functional coating.

15. The article of claim 1, wherein the coated surface has a hardness of about 12 or greater as measured by Berkovich nanoindentation at indention depths of about 100 nm or greater.

16. The article of claim 1, wherein the first portion and/or the second portion of the functional coating comprises polycrystalline or semi-crystalline material comprising $AlO_xN_y$, where x (representing the molar fraction of oxygen relative to aluminum) is from about 0.02 to about 0.25; and where y (representing the molar fraction of nitrogen relative to aluminum) is from about 0.75 to about 0.98.

17. An article, comprising:
  a substrate comprising a primary surface and comprising a glass, glass-ceramic or ceramic composition; and
  a functional coating disposed over the primary surface of the substrate to form a coated surface, the coating comprising:
    a first portion disposed over the primary surface;
    a plurality of interrupting layers disposed over the first portion and comprising a different microstructure than the first portion; and
    a second portion disposed over the plurality of interrupting layers,
  wherein the interrupting layers comprise an optical transmittance of greater than about 85% over the visible wavelength range from about 450 nm to about 650 nm and each of the interrupting layers has a thickness of 100 nm or less; and
  wherein the second portion of the coating within about 100 nm from the interrupting layers comprises an average microstructural crystal size that is smaller than an average microstructural crystal size of the first portion within about 100 nm from the interrupting layers.

18. The article of claim 17, wherein the plurality of interrupting layers comprises a refractive index difference of about 0.1 or greater from any of the first and second portions, and wherein each of the interrupting layers has a thickness of about 5 nm or greater.

19. The article of claim 17, wherein the coating comprises a surface roughness of about 5 nm Rq or less.

* * * * *

UNITED STATES PATENT AND TRADEMARK OFFICE
CERTIFICATE OF CORRECTION

PATENT NO. : 11,072,559 B2
APPLICATION NO. : 16/635645
DATED : July 27, 2021
INVENTOR(S) : Heather Bossard Decker et al.

It is certified that error appears in the above-identified patent and that said Letters Patent is hereby corrected as shown below:

On the Title Page

In Column 2, item (56), Other Publications, Line 3, delete "(2006." and insert -- (2006). --, therefor.

On page 2, in Column 2, item (56), Other Publications, Line 3, delete "(2010." and insert -- (2010). --, therefor.

On page 2, in Column 2, item (56), Other Publications, Line 10, delete "(2005." and insert -- (2005). --, therefor.

On page 2, in Column 2, item (56), Other Publications, Line 11, delete "Instroduction;" and insert -- Introduction; --, therefor.

Signed and Sealed this
Eighteenth Day of July, 2023

Katherine Kelly Vidal
*Director of the United States Patent and Trademark Office*